(12) United States Patent
Kohler

(10) Patent No.: US 11,459,704 B2
(45) Date of Patent: *Oct. 4, 2022

(54) PAPER-SPECIFIC MOISTURE CONTROL IN A TRAVELING PAPER WEB

(71) Applicant: INTPRO, LLC, Uniontown, OH (US)

(72) Inventor: Herbert B. Kohler, Uniontown, OH (US)

(73) Assignee: INTPRO, LLC, Uniontown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,595

(22) Filed: Oct. 14, 2021

(65) Prior Publication Data

US 2022/0034042 A1 Feb. 3, 2022

Related U.S. Application Data

(63) Continuation of application No. 16/984,846, filed on Aug. 4, 2020, now Pat. No. 11,162,226.

(51) Int. Cl.
*B32B 29/08* (2006.01)
*B32B 29/00* (2006.01)
(Continued)

(52) U.S. Cl.
CPC ........... *D21H 27/34* (2013.01); *B32B 29/005* (2013.01); *B32B 29/08* (2013.01); *B32B 37/20* (2013.01);
(Continued)

(58) Field of Classification Search
CPC ........ D21H 27/30; D21H 27/40; D21H 27/34; D21H 17/28; D21H 19/54; B31F 1/20;
(Continued)

(56) References Cited

U.S. PATENT DOCUMENTS

| 1,199,508 A | 9/1916 | Swift, Jr. |
| 1,848,583 A | 3/1932 | Swift, Jr. |

(Continued)

FOREIGN PATENT DOCUMENTS

| CA | 1072873 A | | 3/1980 | |
| CN | 114206601 A | * | 3/2022 | ........... B32B 29/005 |

(Continued)

OTHER PUBLICATIONS

Daub, E. et al., "Gluing corrugating medium and linerboard together on the corrugator," Tappi Journal, pp. 171-178, Jun. 1990.
(Continued)

*Primary Examiner* — Jose A Fortuna
(74) *Attorney, Agent, or Firm* — Pearne & Gordon LLP

(57) ABSTRACT

A network-based system and method for providing desired moisture set point values for individual papers lines based on the physical properties of each liner and the atmospheric conditions associated with a corrugator is disclosed. The desired moisture set point values are based on the hygroexpansivity of each individual paper liner. Once the moisture set point value has been determined, a conditioning apparatus adjusts a moisture value for each liner in order to tune the post-warp characteristics of the final corrugated product.

15 Claims, 4 Drawing Sheets

Related U.S. Application Data

(60) Provisional application No. 62/934,736, filed on Nov. 13, 2019, provisional application No. 62/882,773, filed on Aug. 5, 2019.

(51) Int. Cl.

| | | |
|---|---|---|
| *B32B 37/20* | (2006.01) | |
| *D21F 11/04* | (2006.01) | |
| *B32B 41/00* | (2006.01) | |
| *D21H 27/34* | (2006.01) | |
| *D21F 7/00* | (2006.01) | |
| *D21F 9/02* | (2006.01) | |

(52) U.S. Cl.
CPC .............. *B32B 41/00* (2013.01); *D21F 7/003* (2013.01); *D21F 9/02* (2013.01); *D21F 11/04* (2013.01); *B32B 2250/26* (2013.01)

(58) Field of Classification Search
CPC ...... B31F 1/2818; B31F 1/2831; B31F 1/284; B32B 29/005; B32B 29/08; B32B 37/20; B32B 41/00; B32B 2250/26; B32B 2255/12; B32B 2255/26; D21F 7/003; D21F 9/02; D21F 11/04
See application file for complete search history.

(56) References Cited

U.S. PATENT DOCUMENTS

| | | | |
|---|---|---|---|
| 1,981,338 A | 11/1934 | Swift, Jr. | |
| 2,236,056 A * | 3/1941 | Grimm | B31F 1/285 |
| | | | 156/205 |
| 2,398,844 A | 4/1946 | Muggleton | |
| 2,610,136 A * | 9/1952 | Casey | C09J 103/02 |
| | | | 156/292 |
| 2,622,558 A | 12/1952 | Mikkelsen | |
| 3,026,231 A | 3/1962 | Chavannes | |
| 3,046,935 A | 7/1962 | Wilson | |
| 3,077,222 A | 2/1963 | Shanley | |
| 3,178,494 A | 4/1965 | Tisdale | |
| 3,300,359 A | 1/1967 | Nikkel | |
| 3,303,814 A | 2/1967 | Nitchie | |
| 3,306,805 A | 2/1967 | Klein | |
| 3,383,234 A | 5/1968 | Nikkel | |
| 3,479,240 A | 11/1969 | Moser | |
| 3,560,310 A | 2/1971 | Bolton | |
| 3,648,913 A | 3/1972 | Ferara | |
| 3,676,247 A | 7/1972 | Morris | |
| 3,700,518 A | 10/1972 | Ohmori | |
| 3,773,587 A | 11/1973 | Flewwelling | |
| 3,788,515 A | 1/1974 | Middleman | |
| 3,892,613 A | 7/1975 | McDonald et al. | |
| 3,966,518 A | 6/1976 | Ferara et al. | |
| 3,981,758 A | 9/1976 | Thayer et al. | |
| 4,086,116 A * | 4/1978 | Yazaki | B31F 1/2804 |
| | | | 156/205 |
| 4,104,107 A | 8/1978 | Christensen | |
| 4,134,781 A | 1/1979 | Carstens et al. | |
| 4,155,884 A | 5/1979 | Hughes | |
| 4,177,102 A | 12/1979 | Tokuno | |
| 4,267,008 A | 5/1981 | Owens | |
| 4,282,998 A | 8/1981 | Peekna | |
| 4,306,932 A | 12/1981 | Bradatsch et al. | |
| 4,316,428 A | 2/1982 | Flaum et al. | |
| 4,316,755 A | 2/1982 | Flaum et al. | |
| 4,338,154 A | 7/1982 | Berthelot et al. | |
| 4,344,379 A | 8/1982 | Roberts | |
| 4,351,264 A | 9/1982 | Flaum et al. | |
| 4,453,465 A | 6/1984 | Heller et al. | |
| 4,497,027 A | 1/1985 | McGuire et al. | |
| 4,544,436 A | 10/1985 | Itoh et al. | |
| 4,569,864 A | 2/1986 | McIntyre | |
| 4,589,944 A | 5/1986 | Torti et al. | |
| 4,603,654 A | 8/1986 | Mori et al. | |
| 4,757,782 A | 7/1988 | Pullinen | |
| 4,764,236 A | 8/1988 | Nikkel | |
| 4,806,183 A | 2/1989 | Williams | |
| 4,841,317 A | 6/1989 | Westell | |
| 4,863,087 A | 9/1989 | Kohler | |
| 4,871,593 A | 10/1989 | McIntyre | |
| 4,879,949 A | 11/1989 | Vennike | |
| 4,886,563 A | 12/1989 | Bennett et al. | |
| 4,935,082 A | 6/1990 | Bennett et al. | |
| 4,991,787 A | 2/1991 | Berg | |
| 5,016,801 A | 5/1991 | Gilat et al. | |
| 5,037,665 A | 8/1991 | LaMantia et al. | |
| 5,048,453 A | 9/1991 | Eriksson | |
| 5,103,732 A | 4/1992 | Wells et al. | |
| 5,203,935 A | 4/1993 | May et al. | |
| 5,226,577 A | 7/1993 | Kohler | |
| 5,242,525 A | 9/1993 | Biagiotti | |
| 5,244,518 A * | 9/1993 | Krayenhagen | B31F 1/284 |
| | | | 156/351 |
| 5,246,497 A | 9/1993 | Rantanen | |
| 5,275,657 A | 1/1994 | Duffy et al. | |
| 5,362,346 A | 11/1994 | Bullock, Sr. | |
| 5,503,547 A | 4/1996 | Funahashi et al. | |
| 5,508,083 A | 4/1996 | Chapman, Jr. | |
| 5,527,408 A * | 6/1996 | Allen | B31F 1/2831 |
| | | | 156/351 |
| 5,609,293 A | 3/1997 | Wu et al. | |
| 5,656,124 A * | 8/1997 | Krayenhagen | B31F 1/284 |
| | | | 156/210 |
| 5,660,631 A | 8/1997 | Eriksson | |
| 5,783,006 A | 7/1998 | Klockenkemper et al. | |
| 5,785,802 A | 7/1998 | Seki et al. | |
| 5,861,083 A * | 1/1999 | Klockenkemper | B31F 1/2831 |
| | | | 162/263 |
| 5,894,681 A * | 4/1999 | Klockenkemper | B31F 1/2831 |
| | | | 34/524 |
| 5,943,905 A * | 8/1999 | Klockenkemper | B31F 1/2813 |
| | | | 73/73 |
| 6,051,068 A | 4/2000 | Kohl et al. | |
| 6,058,844 A | 5/2000 | Niemiec | |
| 6,068,701 A | 5/2000 | Kohler et al. | |
| 6,098,687 A | 8/2000 | Ishibuchi et al. | |
| 6,126,750 A | 10/2000 | Seiz et al. | |
| 6,136,417 A * | 10/2000 | Ishibuchi | B31F 1/2872 |
| | | | 156/205 |
| 6,143,113 A | 11/2000 | Berube | |
| 6,155,319 A | 12/2000 | Giugliano et al. | |
| 6,257,520 B1 | 7/2001 | Fujikura | |
| 6,364,247 B1 | 4/2002 | Polkinghorne | |
| 6,418,851 B1 | 7/2002 | Hartmann et al. | |
| 6,470,294 B1 | 10/2002 | Taylor | |
| 6,575,399 B1 | 6/2003 | Lamothe | |
| 6,595,465 B2 | 7/2003 | Lamothe | |
| 6,602,546 B1 | 8/2003 | Kohler | |
| 6,620,240 B2 | 9/2003 | Choi et al. | |
| 6,620,455 B2 | 9/2003 | Mensing et al. | |
| 6,635,111 B1 | 10/2003 | Holtmann et al. | |
| 6,692,602 B1 | 2/2004 | Mensing et al. | |
| 6,800,052 B1 | 10/2004 | Abe | |
| 6,854,496 B2 * | 2/2005 | Ishibuchi | B31F 1/28 |
| | | | 156/351 |
| 7,267,153 B2 | 9/2007 | Kohler | |
| 7,424,901 B2 * | 9/2008 | Ishibuchi | B31F 1/36 |
| | | | 156/367 |
| 7,595,086 B2 | 9/2009 | Kohler | |
| 7,699,084 B2 * | 4/2010 | Ishibuchi | B31F 1/36 |
| | | | 156/351 |
| 7,717,148 B2 | 5/2010 | Kohler | |
| 8,057,621 B2 * | 11/2011 | Kohler | B31F 1/2836 |
| | | | 156/205 |
| 8,398,802 B2 * | 3/2013 | Kohler | B31F 1/2872 |
| | | | 156/205 |
| 10,081,743 B2 * | 9/2018 | Krumm | B31F 1/2818 |
| 10,479,043 B2 * | 11/2019 | Kohler | B31F 1/22 |
| 10,787,770 B2 * | 9/2020 | Heiskanen | B32B 3/26 |
| 11,118,314 B2 * | 9/2021 | Kohler | B31F 1/2845 |
| 11,162,226 B2 * | 11/2021 | Kohler | B31F 1/284 |

(56) References Cited

U.S. PATENT DOCUMENTS

| | | | |
|---|---|---|---|
| 2002/0036067 A1* | 3/2002 | Ishibuchi | B31F 1/28 156/462 |
| 2002/0149866 A1 | 10/2002 | Kato et al. | |
| 2003/0178524 A1 | 9/2003 | Newman | |
| 2004/0241328 A1 | 5/2004 | Bradatsch | |
| 2005/0194088 A1 | 9/2005 | Kohler | |
| 2006/0225830 A1* | 10/2006 | Kohler | B31F 1/2836 156/210 |
| 2010/0181015 A1* | 7/2010 | Kohler | B31F 1/285 156/210 |
| 2011/0011522 A1* | 1/2011 | Kohler | B31F 1/2836 156/210 |
| 2015/0306837 A1* | 10/2015 | Krumm | B31F 1/2845 156/210 |
| 2017/0073554 A1* | 3/2017 | Krumm | C09J 103/02 |
| 2018/0119359 A1 | 5/2018 | Gorden | |
| 2018/0345618 A1* | 12/2018 | Mizutani | B31F 5/04 |
| 2020/0056334 A1* | 2/2020 | Heiskanen | D21H 27/10 |
| 2020/0114613 A1* | 4/2020 | Kohler | B32B 29/08 |
| 2020/0122426 A1* | 4/2020 | Kohler | B31F 1/225 |
| 2021/0040696 A1* | 2/2021 | Kohler | D21H 27/40 |
| 2022/0034042 A1* | 2/2022 | Kohler | D21H 27/40 |

FOREIGN PATENT DOCUMENTS

| | | | | |
|---|---|---|---|---|
| DE | 1018426 A1 | 12/1991 | | |
| EP | 0037332 A1 | 10/1981 | | |
| EP | 0825017 A1 | 2/1998 | | |
| EP | 1199151 A2 | 4/2002 | | |
| EP | 1199152 A2 | 4/2002 | | |
| EP | 1902833 | 3/2008 | | |
| GB | 1544634 A | 4/1979 | | |
| JP | S40-023188 | 8/1965 | | |
| JP | S42-004916 B | 2/1967 | | |
| JP | S56-160832 A | 12/1981 | | |
| JP | H01-228572 A | 9/1989 | | |
| JP | H10-034776 | 2/1998 | | |
| JP | 2000202930 A | 7/2000 | | |
| JP | 2001063918 A | 3/2001 | | |
| JP | 2001334591 | 12/2001 | | |
| JP | 2002192637 A | 7/2002 | | |
| JP | 2003266566 | 9/2003 | | |
| JP | 2005193504 A | 7/2005 | | |
| WO | 2003066319 | 8/2003 | | |
| WO | 2010085614 | 7/2010 | | |
| WO | WO-2021026146 A1 * | 2/2021 | | B32B 29/005 |

OTHER PUBLICATIONS

Eltex Elektrostatik GMBH, "Webmoister 70XR" Presentation.
Inoue, M. et al., "Kinetics of gelatinization of cornstarch adhesive," J. Applied Polymer Sci., vol. 31, pp. 2779-2789, 1986.
Institute of Paper Chemistry, "Development of a Cold Corrugating Process," Contract No. DE-AC02-79CS40211, Appleton, WI, Dec. 15, 1981.
Janes, R.L., "A Study of Adhesion in the Cellulose-Starch-Cellulose System," Institute of Paper Chemistry, Appleton, WI, Jun. 1968.
Kroeschell, W.O., "Bonding on the corrugator," Tappi Journal, pp. 69-74, Feb. 1990.
Ononokpono, O.E. et al., "The influence of binder film thickness on the mechanical properties of binder films in tension," J. Pharm Pharmacol, pp. 126-128, Feb. 1988.
Printco Industries, LLC, "Chambered Reverse Angle Doctor Blade System," retrieved from www.printco-industries.com on Sep. 25, 2009.
Sprague, C.H., "Development of a Cold Corrugating Process Final Report," Institute of Paper Chemistry, Appleton, WI, May 1985.
Whitsitt, W.J. et al., "High Speed Runnability and Bonding: Effects of Medium and Corrugator Conditions on Board Quality," Institute of Paper Chemistry, Appleton, WI, May 1, 1989.
International Search Report and Written Opinion from PCT Application Serial No. PCT/US2005/001925, dated Feb. 22, 2007.
International Search Report, Written Opinion and International Preliminary Report on Patentability from PCT Application Serial No. PCT/US2006/013578, dated Oct. 16, 2007.
International Search Report, Written Opinion and International Preliminary Report on Patentability from PCT Application Serial No. PCT/US2006/035474, dated Aug. 30, 2007.
International Search Report and Written Opinion from PCT Application Serial No. PCT/US2008/067519, dated Oct. 29, 2008.
International Search Report and Written Opinion from PCT Application Serial No. PCT/US2009/037959, dated Aug. 31, 2009.
European Search Report, from European Application No. 03100620.8, dated Oct. 9, 2003.
Prosecution history for U.S. Appl. No. 11/279,347.
Prosecution history for U.S. Appl. No. 11/781,563.
Notice of Rejection dated Sep. 29, 2009 in Japanese Patent Application No. 2007-501779.
International Search Report and Written Opinion dated May 18, 2010 in PCT Application Serial No. PCT/US10/21753.
Shaw, N.W. et al., "Xitex—A revolution in board design and manufacture," Tappi Journal 1997 Corrugated Containers Conference Proceedings.
Salmen, Lennart, et al. "The development and release of dried-in stresses in paper." Nordic Pulp and Paper Research Journal No. 2. 1987. 5 pages.
Reardon, Shaun Anthony. "A Mathematical Model for the Simulation of Paper Drying Energy Consumption." Department of Civil and Mechanical Engineering. University of Tasmania. Nov. 1994. 323 pages.
Larsson, Per. "Hygro- and hydroexpansion of paper—Influence of fibre-joint formation and fibre sorptivity." KTH Royal Institute of Technology. Stockholm, Sweden 2010. 82 pages.
Prosecution history for U.S. Appl. No. 11/259,794.
Office action issued in Canadian patent application No. 2,604,142, dated Jun. 19, 2009.
Office action issued in Canadian patent application No. 2,604,142, dated Aug. 3, 2010.
Habeger, et al. "The Role of Stress Concentrations in Accelerated Creep." IPST Technical Paper Series No. 791. Journal of Pulp and Paper Science. May 1999. 46 pages.
Dwan, Antoinette. "Paper Complexity and the Interpretation of Conservation Research." Journal of the American Institute of Conservation 1987. vol. 26, Article 1. 4 pages.
International Search Report issued in corresponding application No. PCT/US2020/044872 dated Nov. 6, 2020, 3 pages.
Written Opinion issued in corresponding application No. PCT/US2020/044872 dated Nov. 6, 2020, 8 pages.
Taylor, Bruce. "The interaction of paper moisture and temperature and its effect on corrugated board quality." Corrugating International. vol. 1. No. Nov. 3, 1999. 12 pages.
Marin, et al. "Stiffness and strength properties of five paperboards and their moisture dependency." Tappi Journal. vol. 19. No 2. Feb. 2020. pp. 71-85.
Eltex Elektrostatik GMBH, "Webmoister 70XR" Presentation. Oct. 30, 2013.
Eltex Elektrostatik GMBH, "Webmoister 70XR" Presentation, no date available.
Kohler, H.B., "Cold Corrugating" Presentation, no date available.
Page from a brochure for the Marquip Pyrobond Singlefacer, no date available.
"EMTEC Paper Testing Technology—Heat Shrinkage Analyzer" leaflet. 2 pages. www.emtec-papertest.com, no date available.
"EMTEC Paper Testing Technology—Wet Stretch Dynamics Analyzer" leaflet. 2 pages. www.emtec-papertest.com, no date available.
Examination Report issued in related European Patent Application No. 20851163.4-1014; dated May 23, 2022.
Examination Report issued in related European Patent Application No. 21217597.0-1014; dated May 23, 2022.
Office Action issued in related Indian Patent Application No. 202217004524; dated Apr. 21, 2022.
Office action issued in related Chinese Patent Application No. 202080056397.X; dated Jun. 2, 2022.

* cited by examiner

PAPER-SPECIFIC MOISTURE CONTROL IN A TRAVELING PAPER WEB

CROSS REFERENCE TO RELATED APPLICATIONS

This application is a continuation of U.S. patent application Ser. No. 16/984,846, filed Aug. 4, 2020, now U.S. Pat. No. 11,162,226, which claims benefit of U.S. Provisional Patent Application No. 62/882,773, filed Aug. 5, 2019, and U.S. Provisional Patent Application No. 62/934,736, filed Nov. 13, 2019, the contents of which are incorporated herein by reference.

TECHNICAL FIELD

The application relates generally to the production of corrugated cardboard, and more particularly, to moisture and temperature control during the production of corrugated cardboard.

BACKGROUND

The production of corrugated paperboard products is well known. Briefly, in its simplest form a conventional corrugated paperboard structure is made by gluing two flat sheets of web material (called 'liners') to the opposing flute crests of an intermediate, fluted (i.e. corrugated) sheet of web material (called 'medium'). Often this is done by applying lines of glue, which can be an aqueous starch-based adhesive, to the flute crests of the medium and then joining those glue-applied crests to the respective liner in a continuous process. First, a single-face construction is made by joining the first liner to the flute crests at one side of the medium in a single-facer. Then the resulting single-face composite is delivered to a double-backer where the second liner is joined to the opposing flute crests to yield the completed, three-layer corrugated paperboard structure. Such processes are well known, as described for example in U.S. Pat. No. 8,398,802, the contents of which are incorporated herein by reference.

As each or any of the aforementioned liners and medium gain or lose moisture, the resulting product can warp. That is, loss of moisture from a paper layer can result in shrinkage of the paper due to contraction of individual paper fibers within the layer. Conversely, a gain of moisture can result in expansion of the paper due to swelling of the individual paper fibers as they absorb water. One problem in conventional corrugating has been warpage of the finished corrugated paperboard. If the aforementioned layers, and especially the liners, gain or lose water in different amounts from the time they enter the corrugating process until the time they emerge as the composite three-layered structure, and even until well afterward, then the corrugated paperboard will tend to warp. That is, as the opposing liners making up the composite expand (or contract) at different rates or to different degrees, the composite structure inherently must bend to accommodate them and remain bonded together.

Accordingly, it is desirable to maintain as much as possible the moisture content of at least the opposing liners at or near their target moisture content on exiting the corrugating process, so that both during and after that process those layers will not expand or contract relative to one another. If done successfully, the result will be a corrugated paperboard composite that will not post-warp; i.e. that will not warp once it emerges from the corrugating process. Unfortunately, historically this has been easier said than done.

One reason is that in order to facilitate adhesion, the bonding surfaces of the liners typically are heated to promote penetration and gelatinization of the starch adhesive that bonds them to the medium. Moreover, the industry trend has been to use as little starch adhesive as possible to save both cost and weight. This means that what little adhesive is used must penetrate and homogenize as much as possible within the opposing bonding surfaces of the adjacent layers. To ensure maximum penetration and gelatinization for strong adhesion, the papers typically are heated to near the boiling point of water (i.e. 100° C.). While this heating improves one critical corrugating parameter (starch-adhesion bonding), it negatively impacts another: layer moisture content. That is, heating the layers tends to drive out moisture. Thus, the liners go through the corrugating process drier than when they entered, having been dewatered compared to their initial, as-supplied state. As a result, they may tend to shrink (i.e. contract) prior to or even during the process steps for producing a corrugated product. Because the liners become over dry (i.e. dried to a moisture content below their natural state under prevailing conditions), they will tend to pick up atmospheric moisture once they emerge from the corrugation process. Over the next 12-24 hours, as they re-absorb water that was driven from them, two factors typically will produce warpage.

First, each liner typically will not re-expand to its pre-dried condition once it re-absorbs atmospheric moisture, as a result of hysteresis. This means that even once rehydrated, the liners will not return precisely to their original dimensions. Second, the opposing liners can be dried to different degrees during the corrugating process; e.g. because one is carried longer than the other against drying elements such as steam drums or hot plates in a double-backer. Moreover, in conventional corrugating processes the corrugated medium often is not directly artificially heated at all, whereas both opposing liners are. These factors can combine to produce unpredictable or uncontrolled differences in the degree of post-corrugation expansion upon rehydration of the different layers of the corrugated composite, which will produce warp.

Another difficulty is that the gain or loss of moisture for each type of paper is unique. Within each nominal paper basis-weight range, incoming paper layers vary by a number of factors. These factors include furnish, density, polar angle, caliper, hygroexpansivity, hydroexpansivity, moisture resistance, coatings, tensile strength, porosity, and moisture content. Adjusting for these and other factors for a specific supply of paper in order to control the moisture content, and thus shrinkage, has proven difficult. One challenge is that the atmospheric conditions (e.g. temperature and relative humidity) for the location where the supply of paper is stored will impact the rate of gain or loss of moisture for the paper. Another challenge is that the relative hygroexpansive properties for different types of paper vary. As discussed below, this means that even when two paper liners are adjusted to the same moisture content, there still may be warping of the composite structure as the paper fibers in the respective liners gain or lose moisture at different rates.

Current methods of adjusting the moisture content of paper layers include those based on (i) the relative humidity or (ii) the relative humidity and board weight of the paper layer. For example, the following relation is used to set a target moisture percentage for a paper layer based on the relative humidity of the environment where the paper is stored:

$H = $ (relative humidity/10)+1; where relative humidity is in %; e.g. 70% RH would yield $H=8\%$ target moisture content for the paper layer Alternatively, example target moisture percentages for single-wall (SW) and double-wall (DW) corrugated boards in an environment wherein the relative humidity is <50%, 50%, or >50% are shown in Table 1:

TABLE 1

| Relative humidity % | Light SW | Heavy SW | Light DW | Heavy DW |
|---|---|---|---|---|
| <50% | 7.5% | 8.0% | 8.5% | 9.5% |
| 50% | 7.0% | 7.5% | 8.0% | 9.0% |
| >50% | 6.5% | 7.0% | 7.5% | 8.5% |

Of course, the values in Table 1 are generalizations meant to provide ranges of acceptable moisture percentages based on broad ranges of relative humidity. A difficulty with the above relation and the data in Table 1 is that each manufacturer must modify the target moisture percentage based on local conditions, which forces the manufacturer to broaden the range of acceptable moisture percentages. For this approach to work, each manufacturer must constantly fine-tune the properties of each individual paper liner (or medium where desired) in order to reproduce corrugated product that meets desired parameters. This fine-tuning requires a large amount of time, expertise, and resources.

The '802 patent incorporated above describes adjusting the moisture content in each of the three layers (two liners and one medium) to 6-9 wt. % prior to heating and joining them to facilitate starch-adhesive bonding. This moisture adjustment is made using a moisture conditioning apparatus as described in the '802 patent, which applies a uniform, thin-film layer of water to (at least) the bonding surface of the respective liners to adjust their moisture content to be within the range of 6-9 wt. % prior to being fed to either the single-facer or the double-backer, where it will be heated and bonded to an adjacent layer. The resulting thin-film layer of water protected against over-drying the liners. It was a sacrificial surface layer of water that ultimately would absorb (and would be vaporized by) the heat introduced to prepare the liners for corrugating, thus protecting and preserving the moisture already bound up in the paper fibers. This solution functions in many cases. But it can be improved based on moisture-absorption properties of paper webs and the atmospheric conditions that affect them, which were not previously appreciated.

For example, even with a sacrificial moisture layer and concurrent adjustment of the moisture content of each web-material layer to 6-9 wt. %, post-warp still can be observed in some corrugated products.

Moreover, in conjunction with the aforementioned moisture adjustment the '802 patent explains it still can be desirable to regulate moisture-application in the cross-machine direction to compensate for cross-web variations in moisture-content, to ensure as little cross-machine moisture variation as possible. Indeed, conventional corrugators typically include complex systems that detect a cross-machine moisture profile in the traveling paper web, and then attempt to normalize that profile by adding moisture at discrete cross-machine locations corresponding to low-moisture bands. The goal is to attain an effectively zero-gradient moisture profile in the cross-machine direction. This can minimize or prevent cross-machine warpage in the finished product resulting from discrete bands of different moisture content in the web.

The inventor has now discovered an efficient way to compensate for moisture variation in the as-supplied webs without constantly fine tuning the operating parameters of the manufacturing process; and without corrugator operators having to understand all the factors that contribute to post-warp and manually adjust for them. The inventor's solutions disclosed herein also dispense with the aforementioned complex sensing and localized moisture-application equipment designed to measure and apply moisture at discrete cross-machine locations of a traveling web. Not only is such equipment expensive and its operation complex, but it has exhibited limited reproducibility in terms of post-warp outcomes.

SUMMARY

In accordance with one aspect of the present invention, a method of producing a corrugated product is provided. The method includes adjusting a moisture content in a first face-sheet web to a first range of greater than 10 wt. % and up to 30 wt. % by applying a first thin film of liquid to a first surface thereof. The method further includes heating the first face-sheet web and thereafter bonding the first surface of the first face-sheet web to a first side of a fluted medium.

In accordance with another aspect of the present invention, a method of producing a corrugated product is provided. The method includes measuring or assigning a first hygroexpansivity attribute value for a first face-sheet web, and then determining a first moisture-conditioning setpoint for the first face-sheet web based on said first hygroexpansivity attribute value. The method further includes conditioning the first face-sheet web by applying a thin film of a liquid to the first face-sheet web to adjust a moisture content therein within a first range of greater than 10 wt. % and up to 30 wt. % according to the moisture-conditioning setpoint value.

In accordance with another aspect of the present invention, a method of conditioning a traveling web is provided. The method includes (i) assigning a first hygroexpansivity attribute value to a first liner to be used in making a corrugated composite; (ii) determining a first moisture setpoint value for the first liner based on the first hygroexpansivity attribute value; and (iii) conditioning the first liner by applying a first thin film of a liquid to the first liner to adjust its moisture content based on the first moisture setpoint value.

In accordance with another aspect of the present invention, a method of corrugating is provided, which includes (i) receiving from a plurality of corrugators a plurality of respective corrugator input data sets relative to conditions prevalent and/or feedstock materials used at the respective corrugators to produce corrugated products, each said corrugator input data set comprising data values pertaining to any or all of: relative humidity, temperature, pressure, and composition and moisture content of the feedstock materials; (ii) aggregating said plurality of corrugator input data sets in a data storage, wherein said data sets and/or individual data values therein have been correlated with hygroexpansivity attribute values representative of hygroexpansivities of paper webs; (iii) receiving specific corrugator input data comprising data relating a first face-sheet web used or to be used at a specific corrugator for making a specific corrugated product; (iv) comparing the specific corrugator input data against the aggregated data sets in said data storage and identifying or calculating therefrom a first hygroexpansivity attribute value representative of hygroexpansivity behavior of said first face-sheet web; (v) based on said first hygroexpansivity attribute value, determining a first moisture-conditioning setpoint for said first face-sheet web calculated to adjust a moisture content therein to be within a first range of greater than 10 wt. % and up to 30 wt. %; and (vi) transmitting said first moisture-conditioning setpoint to said specific corrugator for use in making said specific corrugated product In accordance with another aspect of the present invention, a network-based system for producing a corrugated product is provided. The system includes a central site adapted to receive via the Internet corrugator input data from a plurality of remote corrugator control terminals each being respectively adapted to collect corrugator input data specific to an associated corrugating operation. The central site includes data-storage means for storing the corrugator input data and a processor for evaluating the corrugator input data and determining hygroexpansivity attribute values therefrom. The processor is further adapted to assign moisture-conditioning setpoints for the respective corrugating operations based on said hygroexpansivity attribute values.

DETAILED DESCRIPTION

Figure 1:
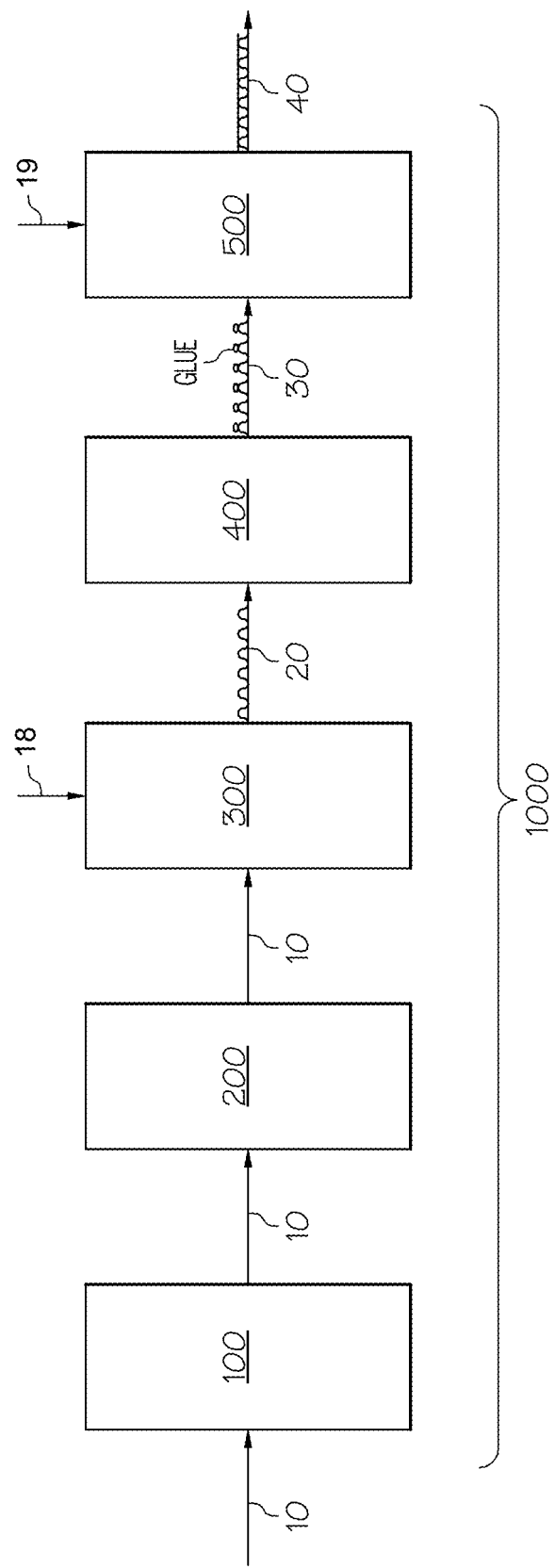
FIG. 1 is a top-level schematic block diagram illustrating example process steps and associated equipment for methods of making composite corrugated board.

As used herein, when a range such as 5-25 or >5 up to 25 is given, this means preferably at least 5 or preferably >5, and separately and independently, preferably not more than 25.

It has been determined that by tabulating the moisture content and other features of individual paper liners, the hygroexpansivity of an individual paper liner can be determined. Then the hygroexpansivity characteristics of different papers having different attributes can be stored in a database. Once the hygroexpansivity of a particular paper has been determined or is known (empirically or predictively), one can establish a specific moisture setpoint value for the individual paper liner, in combination with such setpoint values as are determined for other paper layers in a composite board, in order to tune the post-warp characteristics of that board. To understand this, first a basic understanding of how paper webs absorb water, and importantly how they store, give up, and transfer that water, will be helpful.

A paper web is composed of a network of intermingled and enmeshed fibers that define the web. Those fibers define interior fiber spaces within the cellular structure of the individual fibers themselves. They also define an interstitial space, which is essentially the free or void space located outside individual fibers but within the excluded volume of the overall web defined by the network of fibers. In this manner, a paper web is not unlike a sponge, which is a solid network of fibrous material that defines an intricate system of pores and canals, the latter constituting the void space within the sponge geometry.

Similar to a sponge, a paper web generally holds and transports water in two ways. The first of these is superficial, wherein the paper web can absorb and carry water in the interstitial space defined between and outside of individual paper fibers, but within the void space of the fiber network. The absorption and retention of water in that interstitial space is largely dictated by the mechanics of flow (i.e. water applied to the surface of the web will tend to flow through that space in response to hydrodynamic forces, including gravity). The principal impediment to flow through the interstitial space will be the pressure drop associated therewith (though surface-tension forces also will produce wicking), which can be overcome via application of external forces or increased pressure gradient across the paper web. Absorbed water also can be expelled via application of a mechanical force (e.g. compressing the paper web to shrink its volume and thus drive out the incompressible water from the interstitial space). Under such external pressure, the liquid water generally will flow out from the interstitial space rapidly and easily.

The second way in which paper can hold and transport water is intrinsic, wherein individual fibers of the web absorb and elute moisture to achieve a dynamic equilibrium at the prevailing humidity of the surrounding environment. Absorption and retention of water in this manner, within the paper fibers, is based on the principles of equilibrium and will be governed by the laws of thermodynamics. Thus, the principle driving force for absorption within paper fibers is not hydrodynamic pressure (meaning that simply squeezing or pressing water into the paper will not efficiently hydrate the fibers). Rather, it is the moisture concentration gradient across the fiber membrane, between the interior fiber space and the surrounding environment. Here, moisture will traverse the fiber membrane at a rate proportional to that gradient and to a permeation constant specific to the particular paper composition and the fiber porosity (i.e. factors that are largely immune to external influences). Unlike the interstitial space, it generally takes an extended period for moisture to be introduced within the fibers of the web to equilibrate the fiber with the humidity of the environment. The delay in fiber moisture-reabsorption (or -desorption in some cases), particularly to different degrees in the opposing liners, is what causes a corrugated product that emerges flat from the corrugating process to exhibit post-warp up to 24 hours later.

Even though moisture can take time to enter individual fibers based on a thermodynamic process, it can be driven out rapidly through artificial heating when preparing the web to be bonded via a starch adhesive. Such heating rapidly raises the water temperature in the fibers and converts it to steam, which expands and permeates outside of the fibers faster than liquid water. Notably, the same two factors generally will govern permeation out from the fibers even upon such heating: concentration gradient and permeation constant. However, in the form of steam both these factors favor rapid expulsion of water from the fibers. First, moisture flashed to steam within individual paper fibers is likely to be accompanied by a similar phenomenon for moisture in the interstitial space from the same heat. But evolved steam in the interstitial space will readily travel through the porous network of the web until it is expelled. This will result in a moisture concentration gradient favoring expulsion of steam from within the paper fibers to the interstitial space via diffusion. Second, the permeability coefficient is temperature dependent and high temperatures will increase the permeability of steam through the fiber walls. The result is that heating against a hot plate creates conditions that will facilitate rapid expulsion of moisture from paper fibers according to the prevailing thermodynamic system. Conversely, in the absence of such heat on exiting the corrugation process, a paper web whose fibers have been dewatered in this manner will not re-absorb that moisture so rapidly. This means that although moisture can be readily expelled from within paper fibers on heating in the corrugating process, it will not be so rapidly re-absorbed once that process ends.

Water absorbed in the interstitial space of a paper web contributes to hydroexpansion, i.e. expansion resulting from swelling via separation of the fibers (as opposed to swelling of the fibers themselves) as the fiber network expands to accommodate the absorbed moisture in the interstitial space. Conversely, water absorbed within the paper fibers themselves contributes to hygroexpansion; i.e. expansion resulting from swelling of the individual fibers as they expand to accommodate bound water. Hygroexpansivity refers to the potential for a given paper (or paper fibers) to expand or contract based on the absorption or expulsion of water within or from the paper fibers. It is an intrinsic material property of a particular paper that depends on: (i) individual fiber characteristics, and (ii) the fiber density in the finished paper liner. These characteristics are impacted by prevailing conditions when the paper is made, and by the composition of that paper. These include the prevailing relative humidity, temperature, pressure, and chemical composition of the fibers.

In addition, as discussed more fully below it has been shown that the magnitude of hygroexpansivity for a given paper system decreases significantly with successive humidification cycles from its as-made, i.e. original hygroexpansivity, at least initially. By 'humidification cycle,' it is meant the absorption and subsequent expulsion of water into/from the fibers making up the particular paper layer. This means that by subjecting a paper layer to successive layers of hygroexpansive absorption and desorption, one can effectively reduce the magnitude of future expansions and contractions based on subsequent hygroexpansive absorption/desorption cycles. Though uncertain, the inventor believes this observed phenomenon may be due to hysteretic effects. Specifically, the inventor has observed that reduction in effective hygroexpansivity for a given paper layer can be achieved by increasing the moisture content of a paper layer to greater than 10 wt. % and then heating it (e.g. via steam drums or hot plates) prior to adhering to adjacent layers. The observed reduction is similar to that achievable through successive humidification cycles via (presumed) hysteresis. Without wishing to be bound by theory, perhaps when water is first applied to a paper layer via a thin-film, metered moisture application, the fibers have sufficient time to absorb that moisture and expand via both hydroexpansion and hygroexpansion. Whereas, when the thus wetted paper layer is subsequently heated by wrapping over a steam drum prior to adhering to adjacent layers, the supplied thermal energy may drive out at least some of the fiber-absorbed moisture effectively carrying out a first humidification cycle. Alternatively, due to the excess of moisture supplied, it is possible that within the paper a series of humidification cycles are carried out locally over the steam drum (i.e. vaporization and driving of moisture from fibers, followed by condensation and reabsorption, followed again by vaporization and driving out) to achieve a number of rapid humidification cycles. It has been discovered that the degree of reduction in hygroexpansivity for a given paper can be controlled up to a maximum degree of reduction compared to the as-supplied hygroexpansivity of the paper. For a given paper layer, the maximum degree of hygroexpansivity reduction is believed to be substantially fixed by properties of the paper itself. Moreover, different (e.g. opposed) liners may have different hygroexpansivity-reduction maxima. But by fine-tuning the amount of moisture added via the thin-film metering system and the amount of heat introduced, e.g. via steam drums prior to adhering adjacent layers, one can tune the degree of such reduction up to and including that maximum for each liner—for example to match that of an opposing liner, if desired.

Compared to hydroexpansion (from water in the interstices of the paper web), the magnitude of hygroexpansion (based on absorption within paper fibers) is roughly 2 to 3 times greater for a given volume of water absorbed, at least prior to reducing the hygroexpansive potential through humidification cycling. Stated another way, a given volume of water absorbed within the fibers of a paper web will tend to result in expansion roughly 2-3 times greater than if that same volume of water were absorbed only in the interstitial space of the web. Practically, this means that if a protective coating of moisture applied prior to heating a paper web is insufficient to uniformly isolate the fiber-bound moisture against being vaporized and driven away, then the resulting corrugated product may be deceptively flat due to over drying within the paper fibers themselves. Their delayed re-expansion then will tend to cause post-warp. That is, if all moisture from within the fibers is driven away during the corrugating process, then due to the slow (equilibrium-based) reuptake of moisture into the fibers, any moisture adjustment during the corrugating process will have been entirely within the interstitial space. Confined to only the interstitial space of the web a moisture adjustment within 6-9 wt. % at first will appear to have yielded flat board within an idealized moisture-content range. However, once the fibers re-absorb moisture to restore equilibrium up to 24-48 hours later, the web is likely to deflect 2-3 times more than if resorption were limited to the interstitial space. More simply, significant post-warp still may occur despite that the operator made the intended 6-9 wt. % total-moisture adjustment during the corrugating process as described in the '802 patent.

Complicating things further is the fact that the degree of hygroexpansion changes (i.e. is reduced) following humidification cycles as noted above, presumably due to hysteresis. This also is discussed further below. But if the number of humidification cycles is unknown or uncontrolled, especially between opposing liners that may or may not be of the same material, this variable (presumed) hysteretic effect can yield unpredictable and uncontrolled comparative hygroexpansion of the opposing liners, which contributes to unpredictable warpage.

Not only can fiber-reabsorption result in unexpected post-warp, but even if it is anticipated, adjusting to compensate can prove difficult because the precise end dimensions of the web will depend on not just one, but a number of variables, which can be difficult to predict or model accurately. These include:

a) the degree of intra-fiber moisture reabsorption that will occur, which can vary across the web because different areas may have been better protected based on minor localized variability in the conventional protective 6-9 wt. % moisture layer applied prior to heating, which narrow range represents an idealized condition;

b) consequent (and presumably hysteretic) variable-hygroexpansivity effects, which will introduce further variability particularly to the hygroexpansivity of the individual paper layers; and c) atmospheric conditions that are unique to the local environment of the manufacturer.

Notably, over-drying a paper web during corrugating (e.g. to facilitate bonding) in a manner that drives moisture from its fibers can yield 1% or greater shrinkage in the cross-machine direction because of hysteresis. This shrinkage cannot be corrected by remoistening or rehydration during the time period available during manufacture. Any recovery of moisture within the paper fibers will occur downstream of the corrugator after the papers are bonded together and may create dimensional instability. While this shrinkage will occur uniformly, it is most noticeable in the cross-machine direction, which is finite for a given web. Additionally, seasonal changes alter the atmospheric conditions at each paper supplier's and corrugator's facilities. For example, the atmospheric conditions (e.g. temperature, relative humidity, etc.) at a corrugation site in July will be different than the conditions at the same site in February. These conditions impact the degree of drying for each paper layer, and thus can impact the amount of warpage exhibited in the final corrugated product.

As will be appreciated by now, hygroexpansion (resulting in moisture absorption in or elution from paper fibers) is the most impactful factor contributing to post-warp. Not only does it result in a materially greater degree of expansion or shrinkage compared to water transport into/from the paper via other mechanisms, but it also can be the least predictable between different liners in the same corrugated composite. Therefore, if the hygroexpansivities of the paper layers introduced to a corrugating machine to form the liners of a given corrugated product were known, then one could introduce precisely the correct amount of excess moisture individually to each such layer to ensure that each absorbs an appropriate amount to both protect its fibers from being overdried (yielding significant shrinkage), and condition those fibers (via presumed intra-corrugating hysteretic cycles) to tune/reduce the respective hygroexpansivities in order to prevent post-warp. To do this effectively, one must also know the incoming water content of each such layer, the prevailing conditions at the corrugation site, and the prevailing conditions downstream in which the finished corrugated product is to be stored or used. With this information, and provided that the corrugation system includes a mechanism to apply a high-resolution, precisely metered water layer, the applied moisture could be tuned to account for all these factors so that both the degree and rate of expansion/contraction are matched between the liners of a corrugated composite. If the expansion rates and degrees for both opposing (or all) liners are matched, then there will be minimal or no warpage as they expand/contract together.

In practice this may be easier said than done because, as noted above, hygroexpansivity has a significant and sometimes unpredictable effect on the expansion properties from liner to liner, or even for the same liner at different moments in time depending on the conditions it has undergone. As will be appreciated, cross-tuning highly volatile variables between opposing liners so that they will match can be difficult, even if they could be measured empirically. However, as also noted above, data has shown that the magnitude of hygroexpansivity for a given paper layer tends to decrease significantly through successive humidification cycles, presumably due to hysteresis. Accordingly, in addition to knowing the hygroexpansivities of opposing liners for a corrugated composite, it also is desirable to reduce their magnitudes, for example via hysteretic humidification cycling, prior to adhering the liners to adjacent layers (e.g. medium) in the corrugator. By both reducing the hygroexpansivities of the opposing liners, and tuning their respective moisture content prior to adhering them to the medium, one can not only match the expansive behavior between the liners, but reduce their magnitudes. The former helps reduce or eliminate post-warp, while the latter ensures that imperfect moisture-tuning between the liners will have the least possible contribution to generating post-warp, because any post-warp deflections due to mismatched shrinkage will be small.

In addition to or in conjunction with reducing hygroexpansivity as described above, it also is preferable to apply a sufficiently protective, sacrificial layer of liquid water in substantial excess of what has been conventionally contemplated, to the bonding surface of each liner. This excess moisture layer can at least partially isolate bound moisture within paper fibers to prevent them from being overdried through heating during the corrugation process. This can help suppress post-warp of a corrugated structure by reliably preserving the fiber-bound moisture in the paper webs, and particularly the liners.

Balancing the moisture-layer application to, on the one hand yield a sacrificial layer (to protect the fibers from being over-dried), while on the other hand tune for an appropriate amount of moisture to adjust (reduce) the hygroexpansivity to a desired degree, can be an iterative process. In addition to these effects, one also should consider how applied moisture will affect the internal stresses of the paper web. As-supplied, paper webs generally include formed-in internal stresses based on conditions and the resulting fiber configuration as-formed. These stresses result in internal mechanical forces being exerted within the paper web, which can be inhomogeneous and contribute additional dimensional instability that further promotes post-warp. Applying a precise, excess sacrificial moisture layer also can help reduce these internal stresses if sufficient moisture is applied so that the moistened paper can be dried under restraint, and thus stress-relieve the web.

Specifically, it is known that when a paper web is dried under restraint internal stresses within the paper web can be reduced or eliminated. By applying the substantial excess moisture as disclosed herein such stresses can be reduced, and the overall tensile strength of the liners (and thus of the finished corrugated product) can be increased through stress relief of the paper fibers in those webs. As already discussed, paper swells when wetted and then contracts as it dries, which inherently introduces some stress relief to the paper fibers. Moreover, when a thoroughly wetted paper web is dried under restraint (i.e. under tension), the contractile force of shrinking paper fibers acts against the tensile force that draws the paper in the machine direction, which introduces a substantial amount of stress relief in the web. For example, depending on its basis weight the wetted paper web is subjected to drying under tension forces ranging from 8 kg/meter to 180 kg/meter. This phenomenon, known as 'drying under restraint' in the literature, typically has been studied in paper making and not in drawing paper webs through a corrugating process. However, the inventor believes the same principles would apply here. Accordingly, a substantially wetted paper web (such as webs 18, 19) that dries under tension in the corrugating process, aided by heat delivered (e.g. from preheaters upstream of where the webs are adhered to the medium), will exhibit internal contractile forces that draw against the overall web tension and yield stress relief, and increased tensile strength in the machine direction. Using this process, machine-direction tensile-strength increases in the range of 2.5-10% compared to the incoming webs 18, 19 is to be expected. Notably, such increase in tensile strength due to drying under restraint is not observed at the conventional, relatively low-moisture content to which existing processes adjust the webs (e.g. 6-9 wt. % before the preheaters in a corrugating process). This phenomenon is only to be observed when adjusting that moisture content within the range disclosed herein; i.e. >10 wt. % up to 30 wt. %, and preferably 11-15 wt. %.

Although applying a sacrificial water layer to paper webs for corrugating is known, the water is applied in such low amounts that dried-in stress is never relieved. And as noted above conventional processes tend to over dry the liners. Together, these factors combine to retain internal stresses within each liner, which contribute to dimensional instability in the liner that compounds post-warp resulting from hygroexpansion of the liner. In other words, it is desirable to reduce both hygroexpansivity and internal stress in each liner. Both can be achieved using a material excess of moisture applied in a sacrificial layer to the bonding surface of each liner, as described below.

It has been found that increasing the moisture content in the liners to a level above conventionally-accepted levels (e.g. greater than 10 wt. %; preferably greater than 10 wt. % and up to 30 wt. % as described below), via application of a uniform, metered thin-film of moisture applied to the bonding surface, helps to improve the dimensional stability of the liner, and thus the corrugated product. The disclosed systems and process apply such a layer, which is effective to: isolate and protect fiber-bound moisture (preventing over-drying and resulting hygroexpansive post-warp), reduce the magnitude of hygroexpansive behavior (via presumptive hysteretic cycles within the fibers themselves while being heated), and stress-relieve the paper web by drying it under restraint (i.e. under tension) over hotplates or heated drums to the more conventional 6-9 wt. % on emerging from the corrugating process.

In other words, by raising the moisture content in the liners and then drying under restraint, the magnitude of hygroexpansivity in the liners is reduced while protecting fiber-bound moisture, and internal stresses in the paper are relieved, all of which contribute to more dimensionally stable corrugated product. Most of the drying of the liner occurs prior to combining the liner with the medium, such as when the liner is on a heated surface under tension. For example, the liner is dried under tension when it passes over the heated surface of a preheater, a single-facer pressure roll, or a single-facer belt. However, the bonding surface of the liner remains moist in order to accept starch into the liner.

As the dimensional stability of each liner is improved with the disclosed systems and process, the properties of the final corrugated product are also improved. Conventional systems result in asynchronous hygroexpansion of liners that results in irreversible creep strain, which leads to failure in the corrugated product. By reducing the hygroexpansion of the liners, the properties of the corrugated product will be enhanced, resulting in a more stable and long-lasting corrugated product.

Figure 2:
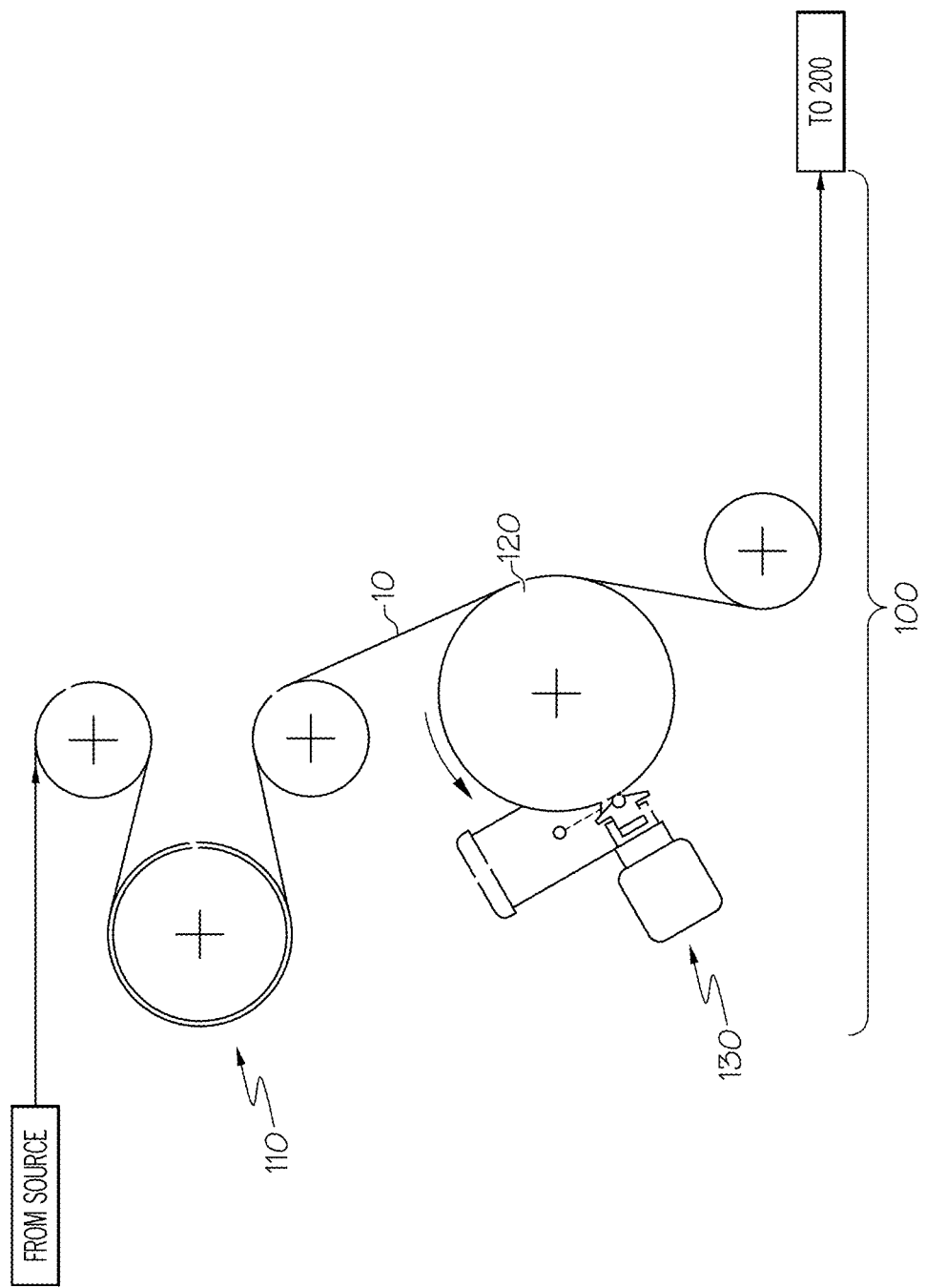
FIG. 2 is a schematic diagram of an example moisture conditioning apparatus 100 that can be used in a corrugating method.

An example corrugator setup will now be briefly described. A block diagram of an example corrugating apparatus 1000 is shown schematically in FIG. 1. In the illustrated embodiment, the corrugating apparatus includes a moisture conditioning apparatus 100 (FIG. 2), a web heating arrangement 200, a single-facer 300, a glue machine 400, and a double-backer 500. These components are arranged in the recited order relative to the machine direction of a web of medium material 10 as it travels along a machine path through the corrugating apparatus 1000 to produce a finished corrugated product 40 exiting the double-backer 500. As will become apparent, the medium material 10 will become the corrugated web to which the opposing first and second face-sheet webs 18 and 19 will be adhered to produce the finished corrugated board 40. The corrugator setup described and illustrated here with respect to FIG. 1 is substantially the same as that described in detail in U.S. Pat. No. 8,398,802 incorporated by reference above. The same setup having similar and alternative features and as described in the '802 patent can be utilized in the methods disclosed herein. Specifically, the same moisture conditioning apparatus 100 (including a thin-film metering device 130) described in the '802 patent (where it is used to condition paper webs to 6-9 wt. % total moisture) can be used to apply the substantial excess of moisture to the bonding surfaces of the medium and liners (and web if desired) as described herein. The moisture conditioning apparatus 100 can be operated and adjusted in the manner described in the '802 patent, to apply an appropriate metered thin-film of water to achieve the desired >10 wt. % up to 30 wt. % of moisture in a paper web as called for herein, to achieve the herein disclosed surprising combination of effects, which yield much-improved dimensional stability.

The first face-sheet web 18 in FIG. 1 will supply the first liner for the finished corrugated product 40 on exiting the corrugator. Prior to applying the first face-sheet web 18 to the corrugated medium material 10 as in the conventional process (e.g. disclosed in the '802 patent), it is conditioned to adjust its moisture content to achieve the combined effects described above of: protecting fiber-bound water to prevent over drying, reducing magnitude of hygroexpansivity, and stress-relieving the face-sheet web 18; all of which can be achieved via drying under restraint (i.e. under tension) against hot plates or heated rollers once the required excess-moisture layer has been applied.

The moisture adjustment can be achieved by applying a substantially continuous thin film of water to the first face-sheet 18 to adjust its overall moisture content to yield a substantial excess of moisture within the desired range as herein disclosed. The water layer can be applied to the side of the web 18 that will be down to (i.e., directly contact) a heat source prior to contacting flutes of the web of medium material 10, on which glue has been applied, for bonding thereto in the single-facer 300.

The resulting single-faced web 20 (composed of the web of medium material 10 adhered to the first-face sheet 18, preferably both of which by now have been moisture conditioned) exits the single-facer 300 and enters the glue machine 400 where glue is applied to the remaining exposed flute crests in order that the second face-sheet web 19 can be applied and adhered thereto in the double-backer 500.

The single-faced web 20, having glue applied to the exposed flute crests, enters the double-backer 500 where the second face-sheet web 19 is applied and adhered to the exposed flute crests and the resulting double-faced corrugated assembly is pressed together.

Prior to entering the double-backer 500, the second face-sheet web 19, which will supply the second liner to the finished corrugated product 40, is conditioned similarly as the first face-sheet web 18 described above to apply a metered thin film of moisture to achieve a substantial excess moisture content within the range disclosed herein. Preferably this layer of moisture is applied to the bonding surface of the second face-sheet web 19, which will be bonded to the exposed flute crests of the web of medium material 10 via glue.

It is contemplated that application of excess moisture in the form of a thin-film, metered layer of water to the bonding surface of at least the webs that will form the liners of the composite corrugated product (i.e. first and second face-sheet webs 18 and 19) will yield enhanced post-warp suppression by several mechanisms as described in detail above. That is, the sacrificial excess moisture layer will at least partially isolate fiber-bound moisture from pre-heating of the liner webs (i.e. the face-sheet webs 18 and 19) to prepare them for bonding, thus preserving much of their intrinsic moisture content throughout the corrugation process. It also will supply excess moisture that can be effective to reduce hygroexpansivity in the liners by supplying sufficient water to undergo a plurality of (believed) humidification cycles. And finally, the excess of moisture will be sufficient that as the face-sheet webs 18 and 19 are dried under tension, e.g. against heated rollers or hotplates as described in the '802 patent, those webs will be stress-relieved through being dried under restraint.

According to preferred embodiments the moisture content of the aforementioned webs will be so adjusted as to be greater than 10 wt. %; preferably greater than 10 wt. % and up to 30 wt. %; more preferably greater than 10 wt. % and up to 20 wt. %; and most preferably 11 wt. % to 15 wt. % or 12 wt. % to 15 wt. % or 12 wt. % to 14 wt. %, e.g. utilizing Moisture-Conditioning Parameters supplied by a Central Site 620 as will be hereafter described. It is most important that the liners (e.g. face-sheet webs 18 and 19) that will be adhered to opposing sides of a corrugated medium layer are conditioned as disclosed herein. Unlike the liners, the web of medium material is corrugated, and the resulting corrugations can function as accumulators of deflection. Accordingly, post-corrugation deflections in the corrugated medium will be less pronounced, because they can be taken up to a large degree by the sinus corrugations therein. Moreover, the opposing liners also act to constrain the medium from opposite directions, also minimizing the impact of post-warp in the medium layer. However, if desired the medium can be conditioned similarly as described here for the liners.

To apply the desired thin films of water to the respective webs 18 and 19, preferably a moisture application roller 120 is used as part of a liner conditioning apparatus 100. Notably, this liner conditioning apparatus 100 is substantially the same as the moisture conditioning apparatus 100 illustrated in FIG. 2 and described in the '802 patent for applying the corresponding layer of moisture, albeit to achieve a lower moisture content. On entering the liner conditioning apparatus 100, the liner 18, 19 can optionally be fed first through a pretensioning mechanism 110 and then past a moisture application roller 120 where moisture is added to the liner 18, 19 to adjust its moisture content in the desired range prior to exiting the medium conditioning apparatus 100. Still, in other examples, the liner 18, 19 can be fed directly past the moisture application roller 120. Moisture is applied to the circumferential surface of the moisture application roller 120 using a first thin film metering device 130. This device 130 is illustrated schematically in FIG. 2 in the moisture conditioning apparatus 100 and is useful to coat a very precisely metered thin film or layer of liquid onto the surface of the roller 120 from a reservoir. To achieve the moisture content desired here, preferably the application roller 120 is metered so that it carries a liquid-water film thickness on its surface of greater than 5μ and up to 100μ, and more preferably greater than 10μ and up to 50μ.

Ideally, the moisture application roller 120 of the apparatus 100 is operated at a surface lineal velocity less than 90% that of the web (18 or 19) conveyed thereagainst, including any speed in the opposite direction of travel of such web. It also is preferred that the dwell distance of the paper web against that roller 120 (i.e. the lineal path length over which a segment of that web is in contact with the moisture application roller 120) is more than 15 mm and up to 100 mm, preferably more than 50 mm and less than 80 mm, for line speeds of 450 meters per minute or lower. These dwell-distance ranges can be adjusted proportionately for line speeds above 450 meters per minute according to the following relation:

(New Range)/(Range Given Above)=(Final Line Speed in mpm)/(450 mpm)

Mechanisms and roller configurations to adjust the wrap angle, and therefore dwell distance, of a traveling web against the moisture application roller 120 are known in the art (e.g. as described in the '802 patent). Dwell distance is preferred over dwell time as a measure of application-roller contact because given the diameter of conventional application rollers and the line speeds of conventional corrugation processes (e.g. 450 m/min as noted above), dwell times will not be materially or perhaps even measurably different for ranges of contact between the traveling web and the moisture application roller 120 that can have a material impact on the total amount of moisture applied. Whereas, dwell distances based on the circumferential area of contact over the application roller 120 will be far more readily observed, measured and controlled, and are easily correlated to applied moisture content in weight percent to a given traveling web in a given corrugating process.

Applying a substantial excess of moisture to a traveling web prior to heating it to facilitate bonding (e.g. >10 wt. % up to 30 wt. % moisture to either of face-sheet webs 18 or 19), as a thin-film metered layer applied to the bonding surface of that web, can provide significant advantages as noted above. First, by applying such a layer of moisture to the bonding surface before pre-heating, the substantial thin film of surface moisture acts as a sacrificial moisture layer that vaporizes near instantly on contacting pre-heating rollers or hot plates, such that the resultant vaporized steam rises up through the paper web, where it nearly immediately re-condenses to vapor (water droplets) and delivers its heat of fusion to the web. In this manner, thermal energy applied initially at only the outer (bonding) surface of the web, is applied to and absorbed by the paper web itself more diffusely, and more evenly, thereby reducing the temperature gradient through the thickness of the web. This vaporization-and-recondensation mechanism also may yield a humidification cycle that effectively contributes to reducing the hygroexpansivity of each liner as described above. Also, because the vast majority of that thermal energy must be absorbed by the surface-present sacrificial moisture layer to supply its heat of vaporization before additional heat is available to penetrate and affect fiber-bound moisture, the fiber-bound moisture is largely protected from being completely vaporized and driven from the fibers. Moreover, the aforementioned substantial excess of moisture renders it less likely that thermal energy will break-through to vaporize and drive out fiber-bound moisture, thus preserving that moisture.

Although some excess interstitial moisture introduced by the sacrificial layer may dry after the finished corrugated product has been produced, as noted above the resulting hydroexpansion (contraction) will be a fraction in magnitude compared to the hygroexpansion as would result were all the fiber-bound moisture driven off and then re-absorbed. The resulting smaller-magnitude contractions based on loss of interstitial moisture, and based on both reduced and matched hygroexpansivities of the opposing liners, are more likely to be both: a) uniform in the opposing liners (webs 18 and 19) if they are coated similarly with excess sacrificial moisture layers—meaning that the net post-warp would be zero because the opposing liners will balance one another out; and b) small enough as not to result in unacceptable post-warp.

Yet another benefit of adjusting the moisture content in the preferred excess range disclosed herein is that it can result in automatically leveling the cross-machine moisture content of a web without web-profiling sensors, equipment or feedback control. In addition to the benefits described above, applying excess moisture to the webs 18 and 19 in a preferred range, e.g. >10 wt. % and up to 30 wt. %, via a moisture-application roller 120 having a water-film thickness of >5µ up to 100µ, yields an excess of applied moisture that will facilitate enhanced penetration of liquid and vaporized moisture through the pore structure of the web by wicking and associated interstitial absorption. Such wicking will tend to be greater in cross-machine bands of the web that are dryer, and it will tend to be least in such bands that are already well wetted or saturated. The result is that the paper will tend to inherently self-balance its cross-machine moisture content until its full cross-machine interstitial expanse is uniformly wetted via absorbed moisture, which will inherently reduce and perhaps eliminate any other cross-machine warping effects. The excess moisture application in the ranges described here supplies sufficient total moisture to allow this to reliably occur.

Thus, a proper balance of excess-applied moisture will present the cooperative effects of safeguarding the intrinsic moisture of the paper web (i.e. fiber-bound moisture) and stress-relieving the paper as already described, minimizing and cross-tuning the hygroexpansivity of the opposing liners of a corrugated composite (even further reducing post-warp), and minimizing cross-web localized moisture gradients that may have been introduced in manufacturing or otherwise by the moisture application roller 120 itself. Conversely, too much excess moisture (e.g. above the aforementioned parameters of not more than 100µ water-film layer on the application roller 120, or more than 30 wt. % moisture present in the web 18, 19 after moisture application) can result in entrainment of the web pore structure adjacent to the bonding surface where the moisture layer was applied. This can inhibit penetration and uniform wicking as described above, which may deleteriously affect both cross-machine auto self-leveling of the paper web as well as fiber-bound moisture preservation.

Cross-machine direction auto-leveling of paper webs using the methodologies described here can be particularly important in linear-corrugating operations. Unlike conventional corrugating, in linear corrugating the corrugated medium possesses flutes that run parallel to the machine direction, such that they are glued to the opposing liner webs (18, 19) along glue lines running parallel to and along the length of those webs. Because of the way paper webs typically are manufactured, the potential for shrinkage (due to loss of moisture) is three times greater in the cross-machine direction than in the machine direction. This is due to the orientation of the fibers being primarily in the machine direction, as well as the fact that it is easier to maintain the web under restraint (i.e. under tension) in the machine direction while drying (e.g. by increasing tension differences between successive dryer sections through incremental speed ratio changes).

Accordingly, variable moisture bands in the cross-machine direction of a traveling paper web (e.g. one or both of web(s) 18, 19) can be particularly problematic in terms of cross-machine direction warpage (shrinkage). For example, if there are bands that are overdried, or that shrink at different rates or to different magnitudes, relative to other bands—or to the opposing liner 18 or 19 opposite the web of medium material 10—then unpredictable and uncontrollable cross-machine warpage can occur.

In conventional corrugated products, where the flutes extend in the cross-machine direction, those flutes contribute cross-machine stiffness that largely resists or counteracts shrinkage as may otherwise occur due to a variable cross-machine moisture profile. However, in linear corrugating the flutes extend along the machine direction, and along the length of the finished corrugated product. These machine-direction flutes contribute their stiffness along the length of the corrugated product, and present little resistance to cross-machine shrinkage. As a result, a linear corrugated product will have a much greater potential for cross-machine shrinkage compared to a conventional corrugated product made under identical conditions.

The presently disclosed auto-leveling technique, when applied at least to the webs of liner material 18 and 19, minimizes or effectively eliminates cross-machine shrinkage by ensuring that the paper is both uniformly wetted and uniformly protected against uncontrolled intrinsic (bound) moisture-loss in the cross-machine direction. Thus, even if webs having variable cross-machine moisture bands are fed to a linear corrugating apparatus, e.g. that disclosed in U.S. Pat. No. 8,771,579 (incorporated herein by reference in its entirety) as the opposing liners, by conditioning them as herein disclosed little to no cross-machine warpage or shrinkage can be achieved.

Importantly, the aforementioned cross-machine direction auto-leveling affect is inherent to the operation of the system as described, if sufficient moisture is applied to allow for it and so long as too much excess moisture is not (i.e. >10 wt. % up to 30 wt. % depending on the application). That means that a corrugation system operated as described here can exclude web-profiling apparatus designed to measure and then adjust the cross-machine direction moisture content in the web. In other words, it is not necessary to incorporate moisture-detection sensors at discrete cross-machine locations of the traveling web to provide feedback control. It is equally not necessary to discretely apply moisture to relatively low-moisture bands in the web. When operated as described here, a moisture conditioning apparatus 100 can be used to supply sufficient excess water to adjust the moisture content in the traveling paper web to be within the range of >10 wt. % to 30 wt. % (more preferably 11 wt. % to 15 wt. %), which will yield a robust sacrificial moisture layer on the bonding surface of each of the liners (webs 18,19) to achieve hygroexpansivity-mediated post-warp control.

The selective absorption of excess deposited moisture in dryer moisture bands to achieve auto-leveling is largely automatic due to faster wicking and absorption rates of dryer paper. But web tension also plays a role and is subject to limited adjustment in order to enhance the effect. Specifically, the greater the web tension against a moisture-application roller 120 as it traverses that roller, the greater the moisture transfer into the paper web. In a given web, cross-machine web bands that are relatively dry will have shorter paper fibers than the mean fiber length in the paper. This is because dryer fibers typically contracted or at least are un-swollen relative to wetter fibers. Conversely, relatively wetter web bands will have longer paper fibers compared to the mean fiber length in the web for the opposite reason. As will be appreciated, shorter fiber lengths generally will result in relatively higher localized tension in dryer web bands, whereas longer fiber lengths generally will result in relatively lower localized tension in wetter web bands. The overall result is that for a given web traversing a moisture application roller 120 at a given mean web tension (e.g. depending on basis weight, tension of from 8 kg/meter to 180 kg/meter), dryer bands will tend to have a nominally higher tension (e.g. tension of 12 kg/meter to 270 kg/meter) than the mean, such that they are tensioned slightly more strongly against the application roller 120. Whereas wetter bands will tend to have a nominally lower tension (e.g. tension of 5.3 to 120 kg/meter) such that they are tensioned slightly less strongly against the roller 120. This variable-tension effect will tend to cause moisture from the water film on the application roller 120 to be driven more strongly into lower-moisture bands than into higher-moisture bands, thus enhancing the auto-leveling effect when applying a substantial excess of moisture to the web.

To enhance this effect, the roll-speed ratio between the application roller 120 of the moisture conditioning apparatus 100 and the traveling web 18,19 can be adjusted to regulate, and enhance, web tension against the roller 120. As used herein, this roll-speed ratio is defined as the ratio of the surface lineal speed of the application roller's 120 circumferential surface, to the linear speed of the web 18,19 tensioned against and traveling over (a portion of) that surface. Thus a roll-speed ratio of 100% would mean that the surface lineal speed of the roller's circumferential surface is traveling in the same direction and at the same speed as the web 18, 19 thereagainst—meaning effectively zero slippage therebetween. For most conventional paper basis-weights (typically 45-500 GSM), in conjunction with the preferred water-film thickness and dwell distance ranges herein disclosed, it is desirable to operate the application roller 120 at a roll-speed ratio at least 5% deviant from 100% (either overspeed or underspeed), and more preferably at least 10% deviant from 100% (either overspeed or underspeed), but in the same direction as the web 18,19 is traveling. As will be appreciated, the latter means roll-speed ratios greater than 110% or less than 90% depending on whether the roller 120 is operated at overspeed or underspeed, respectively. Ideally, the roll-speed ratio is adjusted consistent with these ranges in order to increase the localized web tension at the application roller 120 by 15-30% of the baseline web tension in the corrugating process; the latter of which typically is maintained at from 10 to 25 percent of the web's ultimate tensile strength. For example, when the baseline web tension in the corrugating process is 8 kg/meter to 180 kg/meter, the localized web tension at the application roller 120 may be 9.2 kg/meter to 234 kg/meter. Importantly, the roll-speed ratio also is a data point that can be included in the corrugator input data and cross-classified against hygroexpansivity attribute values described below, and used to predictively model such values.

From the standpoint of moisture-application and penetration to achieve auto-leveling, over-versus under-speed operation is not believed critical. Thus, this selection may be based on extrinsic factors related to the upstream or downstream operation of the overall corrugation system, recognizing that overspeed operation will increase upstream web tension and underspeed operation will increase downstream web tension. Reverse-direction operation of the application roller 120 (i.e. resulting in negative roll-speed ratios) generally is not desired except for medium to heavy basis-weight paper webs, e.g. 125-325 grams per square meter (GSM) or greater. In any event, it is contemplated that reverse-direction operation should be avoided for web basis weights below 70 GSM.

Importantly, it is believed that the enhanced dimensional stability and self-leveling effects described here will be achieved via application of the noted excess-moisture to only one surface of each of the liner webs (i.e. webs 18,19) with the bonding surface typically preferred. But satisfactory results can be achieved by applying a single layer to the non-bonding surface if machine layout considerations require it. Though a moisture layer can be applied to both sides of each of liner webs 18 and 19, it is believed that application of the moisture as described here to only the bonding (or the opposing) surface will achieve the described dual benefits of both machine-direction and cross-machine post-warp reduction, such that dual-side application will be unnecessary and therefore is less preferred.

It was particularly unintuitive that one can effectively compensate for variable moisture bands in a web by applying a uniform thin film of water to the web. Contrary to conventional methods of localized measuring and metering of web-moisture content cross-machine, the inventor applies a constant-thickness, uniform excess water film to the liner webs 18,19, with no localized measuring or metering, and relies on natural processes to normalize the cross-machine moisture content in the web. It was surprising and unexpected that cross-machine localized moisture gradients could be nulled out via application not of localized and tuned amounts of moisture as is conventional, but of a constant-thickness excess-moisture layer across the full width of the web. The fact that this process can be executed without closed-loop feedback control to tune precise moisture-application at discrete lateral locations across the web width is a substantial advantage over conventional systems because it will save the significant capital and operating cost required to incorporate localized, cross-machine moisture-applicators and the associated sensor-based feedback control loops. In sum, the fact that this process can be executed automatically so that it is inherently and reliably auto-self leveling in cross-machine direction moisture, and in the absence of any sensors or other feedback control, was a surprising result.

Moreover, methods disclosed herein run contrary to conventional wisdom and industry norms for applying moisture to face-sheet webs 18 and 19 for producing liners in corrugated products. As disclosed in the '802 patent, it is conventional to adjust the moisture content in those webs to be within the range of 6-9 wt. % moisture, prior to preheating those webs to facilitate starch bonding to the web of medium material. Applying additional moisture was considered unnecessary to protect the paper from dehydration through heating. Indeed, applying additional moisture would have been undesirable because such excess would waste both water and energy, and add cost. It is for this reason that in the '802 patent the moisture-conditioning adjustment of the webs is precisely controlled to be within the range of 6-9 wt. %. But the inventor has discovered that applying additional excess moisture can yield the aforementioned cross-machine direction auto-leveling effect, essentially turning bad liner-web source stock (that otherwise might not have been suitable for use in the corrugating process) into acceptably flat source stock suitable for making corrugated product. At the same time it can be used to adjust and tune opposing hygroexpansivities of the liners making up a corrugated composite to minimize the effects of post-warp, and to introduce stress-relief into the paper, in a way not previously understood or anticipated. Indeed, as much as 1.5 to 4 times as much moisture as would have been conventionally applied can be used to level the paper web and minimize or eliminate the presence of variable-moisture bands therein, which will materially reduce or even eliminate the tendency of the final product to exhibit cross-machine warpage as known in the art, as well as to minimize shrinkage-based post-warp from hygroexpansive and stress effects.

In addition to the improved dimensional stability and auto-self leveling features described above, application of the disclosed excess moisture to the face-sheet webs 18, 19 before preheating also can enable reducing the amount of starch used to bond those webs to the intermediate web of medium material. For example, by adjusting the moisture content in the face-sheet webs 18,19 (liners) to the range of 6-9 wt. % as disclosed in the '802 patent, when using a typical C-fluted medium and up to 35# paper stock for all three webs (two liners 18,19 and one medium), one generally achieves penetration depths into the opposing liner webs of 1.7 mils as observed in the finished corrugated product, based on a starch-adhesive application rate of 3.5 to 6 g/m² (dry basis, excepting incidental moisture as is standard). This application rate refers to the total starch applied as adhesive to yield the finished corrugated product, and accounts for adhesive application to flutes at both sides of the medium. However, applying the substantial excess of moisture disclosed here, one can achieve 25-35% deeper starch penetration from the bonding surface of each web 18,19 under the same conditions, e.g. from about 2.1 to up to about 2.3 mils. This substantial improvement in starch-depth penetration is believed due to lower overall viscosity of the adhesive composition once applied to the web 18,19 (and thus increased flow through the pore structure of the web), as well as improved sub-surface starch gelatinization (i.e. expansion). Both of these effects in-turn are believed due to the substantial excess of moisture available starting from the bonding surface where the starch-based adhesive composition is applied. That is, the material increase in free interstitial water within the sub-surface paper matrix both promotes deeper penetration of starch granules through increased (lower-viscosity) flow, and facilitates greater gelatinization of starch granules, which can increase up to two orders of magnitude in volume upon absorbing available moisture.

Alternatively, using the disclosed process one can achieve comparable penetration depths as in conventional processes (e.g. ~1.7 mils) but with 30% less starch on a solid basis. For example, again for C-flute, to achieve ~1.7-mil penetration in both the opposing liner webs in a finished corrugated product one need apply only 2.1-4 g/m² starch (dry basis, excepting incidental moisture as is standard) measured similarly as above.

A similar ~30% reduction in starch-application rate can achieve similar ~1.7-mil starch penetration for other flute sizes compared to conventional starch-application rates. Table 3 below illustrates typical numbers of flutes per foot for a variety of conventional flute sizes, and provides proportions of flute-per-foot compared to C-flute. It is noted that these values are not standards, as different-sized flutes can be utilized at different pitches in the corrugated medium. But Table 3 is illustrative to demonstrate approximate glue-application rates for typical pitches of various conventional flutes. According to the disclosed typical pitches, C flute has around 38 flutes per foot, while E flute has around 90.

TABLE 3

| Flute Size | Typical # Flutes/Foot | Ratio compared to C-flute |
|---|---|---|
| A | 36 | 0.942 |
| B | 49 | 1.283 |
| C | 38.2 | 1.000 |
| E | 90 | 2.356 |
| F | 128 | 3.351 |
| G | 179 | 4.685 |

Figure 4:
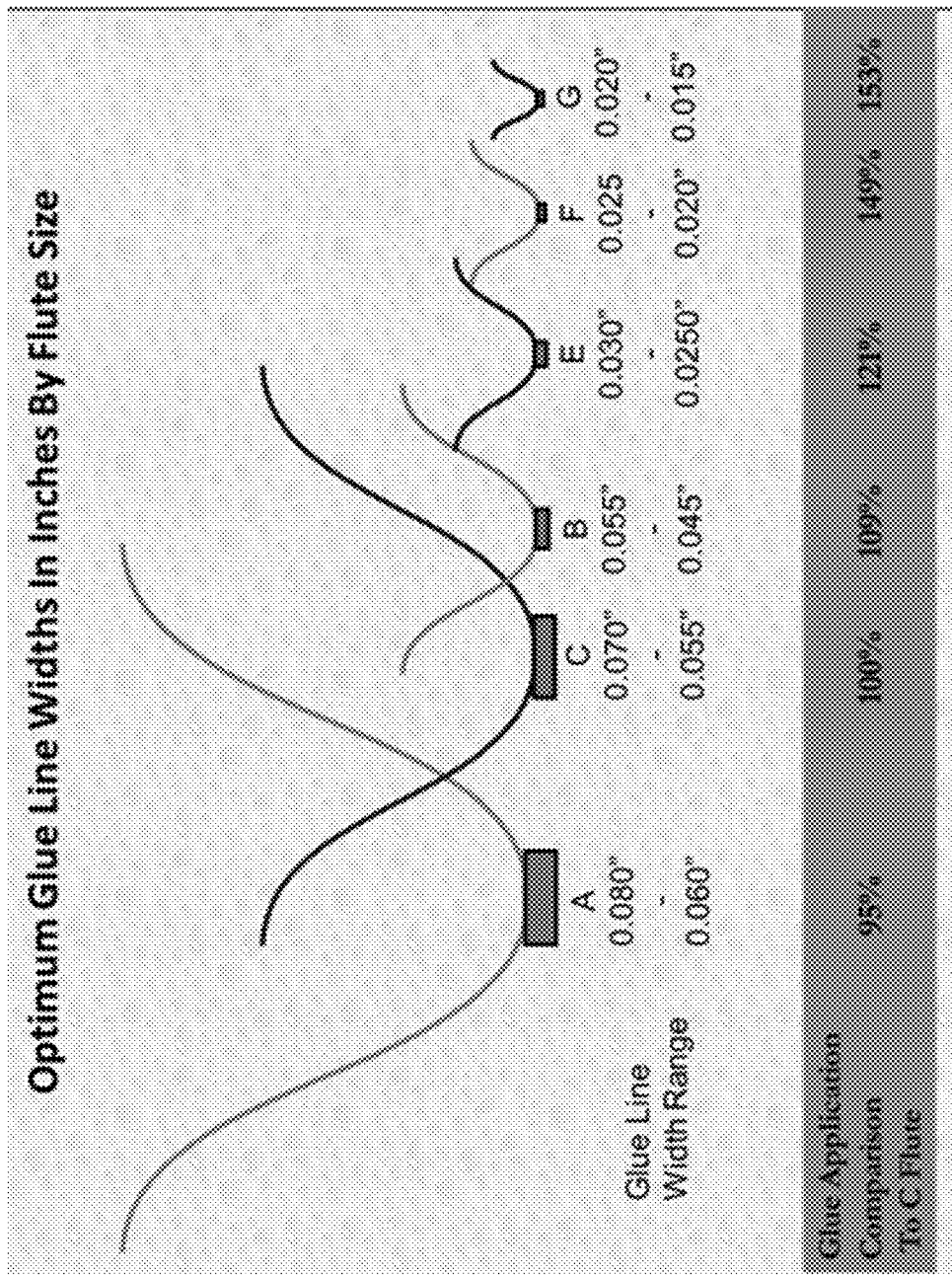
FIG. 4 is a chart depicting preferred glue line widths in inches by flute size.

The ratio of 90/38.2 is 2.356, meaning that at first glance there should be ~2.4× more glue for E flute as for C flute according to Table 3. Indeed, as the flutes get smaller one can see the number of glue lines, and presumably the total glue application rate, will increase. But as FIG. 4 shows, the glue line widths also get smaller as the flutes get closer together. Additionally, the glue line thicknesses get smaller as flute heights get smaller. These two additional factors tend to counteract the amount of excess glue that may be expected just from increasing the number of glue lines (as seen in Table 3), thus reducing the real difference in glue consumption compared to the ratio of the number of flutes relative to C-flute. For example, given the flute spacings and glue-line widths in Table 3 and FIG. 4, the glue-application rate for E-flute is roughly 1.21 times that of C-flute. Other typical comparison percentages are given for other flute sizes compared to C-flute in FIG. 4.

By applying the substantial excess moisture to the liner webs 18, 19 as disclosed herein, one can reduce the corresponding glue-application rates by ~30% for other flute sizes and yet still achieve industry-desired starch penetration (solids basis) of roughly 1.7 mils from the bonding surface. Note there may be some variability in actual practice because to achieve the same 30% reduction as with C-flute for other-sized flutes, the paper basis weight for webs of the other flute sizes must be the same. This is rarely the case, and using different-weight papers for non-C flute webs will impact the proportionate reduction in starch required to achieve comparable penetration depth in the associated web. However, the basic principal remains that using the disclosed process, a marked reduction in the starch-application rate (solid basis) to the flute crests for making a corrugated product can result in little to no loss in penetration depth in a given instance. It is contemplated that for typical paper basis weights used for different flute sizes, A through G, when applying the substantial excess of moisture as disclosed herein to the liner webs 18, 19, starch-application rate reductions of ~25-35% can result in standard ~1.7-mil starch penetration (solid basis) compared to the application rate that otherwise would have been required under identical conditions using conventional processes.

Having now recognized the aforementioned relationships, it is desirable to utilize those relationships predictively to predetermine the appropriate amount of moisture to apply to the webs for supplying liners for corrugated products in a given instance. For example, knowing the starting moisture content of a particular liner web, and understanding its starting hygroexpansivity behavior and how that behavior is likely to change based on humidification cycles, as well as understanding the stress-relieving characteristics of drying excessively-moisturized paper under restraint, one can better determine the appropriate amount of moisture to apply to that web to achieve an appropriate pre-heated moisture content in the desired range to achieve the disclosed benefits. By tabulating these and other factors for different starting paper stocks and cross-referencing with the conditions prevalent at different corrugation installations, one can construct a database to predictively determine appropriate moisture-conditioning setpoints for applying the disclosed metered liquid layer to achieve appropriate overall moisture content for the desired post-warp behavior—and even to tune it (to zero, if desired).

One begins with hygroexpansivity. The hygroexpansivity of each paper may be calculated, for example, via an empirical relation. The following empirical relation defines an arbitrary hygroexpansivity value, $\beta$, as a normalized difference between the length of a fixed segment of paper observed at two different values of relative humidity after equilibration with the humid environment. In this case, $\beta$ is defined as the difference in length from equilibration at 85% RH ($l_{85}$) to 33% RH ($l_{33}$), relative to a standardized length for that segment ($l_0$) multiplied by 100.

$$\beta = \frac{(l_{85} - l_{33})}{l_0} * 100$$

Of course, as noted above the value for $\beta$ can be expected to shrink following successive humidification cycles. This is because the length values $l_{85}$ and $l_{33}$ may be reduced following such cycles, resulting in different, smaller values for $\beta$. The value of $\beta$ also is likely to be at least loosely temperature dependent. So in practical terms, a quantified value for hygroexpansivity such as $\beta$ (quantified from the foregoing relation) may be best used to catalog and characterize the known hygroexpansive behavior determined through empirical measurement of different papers made under known, controlled conditions, and to relate them to predicted hygroexpansive behavior of other papers that are not empirically measured but which are nonetheless made under similar conditions, or which have undergone similar environmental episodes. Quantified values of $\beta$ from the above relation are less likely to be useful to denote the absolute hygroexpansivity of a specific paper, from which moisture-adjustment can be tuned.

If one can measure or otherwise assign a hygroexpansivity value or coefficient to different papers used to make different liners, normalized relative to a substantially common scale or set of parameters for equating hygroexpansive behavior to manufacturing, experiential and environmental conditions, then one will have the basis to predict the hygroexpansive behavior of a given liner, and to tune the pre-adhesion moisture application to achieve predicted expansive behavior. Most importantly, by knowing such values/coefficients for two opposing liners used in the same corrugated composite, one can have a starting point for tuning them relative to one another to effectively and reproducibly minimize post-warp, or to sustain a desired (tuned-in) degree of warpage (concavity) coming off the corrugator. This is true even though the opposing liners may not be of the same material, the same caliper, from the same supplier, etc.—i.e. knowing commonly-grounded hygroexpansivity coefficients for two opposing liners, one can tune them individually toward a final corrugated composite wherein their expansive behavior will essentially match. To be clear, the precise empirical relation for calculating a hygroexpansivity value/coefficient is not critical. So long as such a value can be calculated or derived for each via a common methodology or relation across a range of papers, they all can be related to identify the relative hygroexpansive behavior characteristic from one paper layer to the next, which will enable the sort of liner-to-liner tuning described here for a given corrugated composite.

Once a database of hygroexpansive characteristics has been established for different papers, environmental factors, etc., another factor that can be associated with each paper category is the degree to which its hygroexpansive magnitude can be reduced based on defined environmental factors or processing steps. As noted above, it is desirable to reduce the hygroexpansivity of individual paper layers as much as possible, to decrease the magnitude of post-corrugation expansion/contraction, which will tend to minimize the magnitude of any post-warp. However, it also must be realized that the opposing liners for a given corrugated composite may have different potentials for reduced hygroexpansivity—just like they may have different initial hygroexpansivities based on their respective makeup and other factors. Accordingly, usually it will be desirable to identify a lowest common hygroexpansivity to which both liners for a given corrugated composite can be reduced via processing steps, so that their hygroexpansivities can be matched at that lowest common value.

An example process contemplated herein includes the following steps: (a) measure or assign a hygroexpansivity attribute value to a liner web that is to be used in making a corrugated composite; (b) moisture condition the liner web to introduce a precisely metered amount of water thereto, taking account of the moisture present in the liner as-supplied to the corrugating process and the anticipated post-corrugation environmental conditions; and (c) optionally heat-treating the liner following moisture conditioning but prior to adhering to adjacent layers (such as a corrugated medium) to fine-tune the moisture adjustment and to adjust its hygroexpansivity in order to achieve a desired degree of post-corrugation hygroexpansion (which can be zero) to minimize post-warp, or to sustain a pre-determined degree of post-warp. For reasons already given, the total pre-heated moisture content in the liner web should be within the range of >10 wt. % up to 30 wt. %. The aforementioned heat-treatment can be utilized to effectively reduce the hygroexpansivity of the liner, comparable to that as may be observed by subjecting the liner to successive humidification cycles. Indeed, the degree of hygroexpansivity reduction for a given paper liner under given conditions (including the degree of heating—based on both heating flux to the paper and residence time of heating) can be correlated to that paper as part of its hygroexpansivity value or characteristic measured or assigned in step (a) above. This process can be carried out on both opposing liners for a corrugated composite made via the corrugation machine, in order that the degree of post-corrugation hygroexpansion in each is tuned based on or to match that of the other. In this manner, not only can the hygroexpansivity of each liner be tuned to achieve a desired degree of post-corrugation expansion (including substantially none, if desired), but the hygroexpansivities of opposing liners can be reduced to a least common degree between them as described above.

If the hygroexpansive properties of respective liners for a desired corrugated composite are known, then the least common hygroexpansivity attainable by each of them also can be known. In view of this, and of the prevailing atmospheric conditions at the corrugation site and downstream where the final product is to be stored and/or used, a moisture setpoint value can be recommended and applied as a precisely metered thin film of water to each paper liner web. The result is that as the paper layers gain or lose moisture post-corrugation (depending on conditions), the hygroexpansivity of each paper layer is fine-tuned so that each layer will gain/lose moisture to substantially the same degree and at substantially the same rate such that any dimensional changes between the layers will be matched, minimizing (if not eliminating) post-corrugation warp.

As noted, step (a) above can be carried out by empirically measuring, or calculating, hygroexpansivity values. It will be possible to calculate such values for a given liner in a given application by measuring its post-corrugation shape-change behavior, knowing its initial moisture as well as the moisture added prior to the corrugating stages, as well as the amount of heat energy supplied during corrugating. But even measuring these values directly, for reasons that will be clear above they will be useful primarily for papers that are to be corrugated in the same location and under the same conditions where measured. They will be less useful to relate the values for papers measured at different locations under different prevailing conditions, or to values measured for different papers entirely. Rather, when relating one hygroexpansivity value for one paper to another such value for another paper, those values will be most useful as guidelines to identify starting points or trajectories for hygroexpansivity conditioning between the compared papers. Accordingly, the inventor herein also contemplates assigning hygroexpansivity attribute values to paper liners reflective of their hygroexpansivity behavior based on the observed expansive behaviors of other papers that are known to have been made and used under comparable conditions. By establishing a central database of hygroexpansive attribute values for different paper liners, and cross-classifying those attributes to other known or measured factors for the respective liners, one can assign predictive, data-based hygroexpansivity attribute values to individual papers based on comparable papers whose behavior has been observed and the corresponding data already saved to the database.

In this manner, data-driven, predictive hygroexpansivity attribute values that reflect true hygroexpansivity can be utilized and assigned to the liners used at different corrugation sites, including liners from different sources and even mis-matched liners for making the same-corrugating composite. Those values can be used to establish or recommend moisture-conditioning settings to introduce proper amounts of moisture and heat in order to achieve predictable, controllable degree of post-warp—for individual liners, or for opposing liners cooperating with one another. Such other known or measured factors that can be cross-classified or correlated to the hygroexpansivity attribute value for a given paper include, but are not limited to: the atmospheric conditions under which they were made, the date and location made and the machinery or supplier used, the time and conditions of transit to the corrugator, the prevailing conditions at the corrugator and the corrugating machinery used, the degree to which particular moisture-conditioning treatment—including moisture-application and heating—affects or reduces hygroexpansivity, the post-corrugation environmental factors, or any other factor that can be measured and tabulated in a database.

Figure 3:
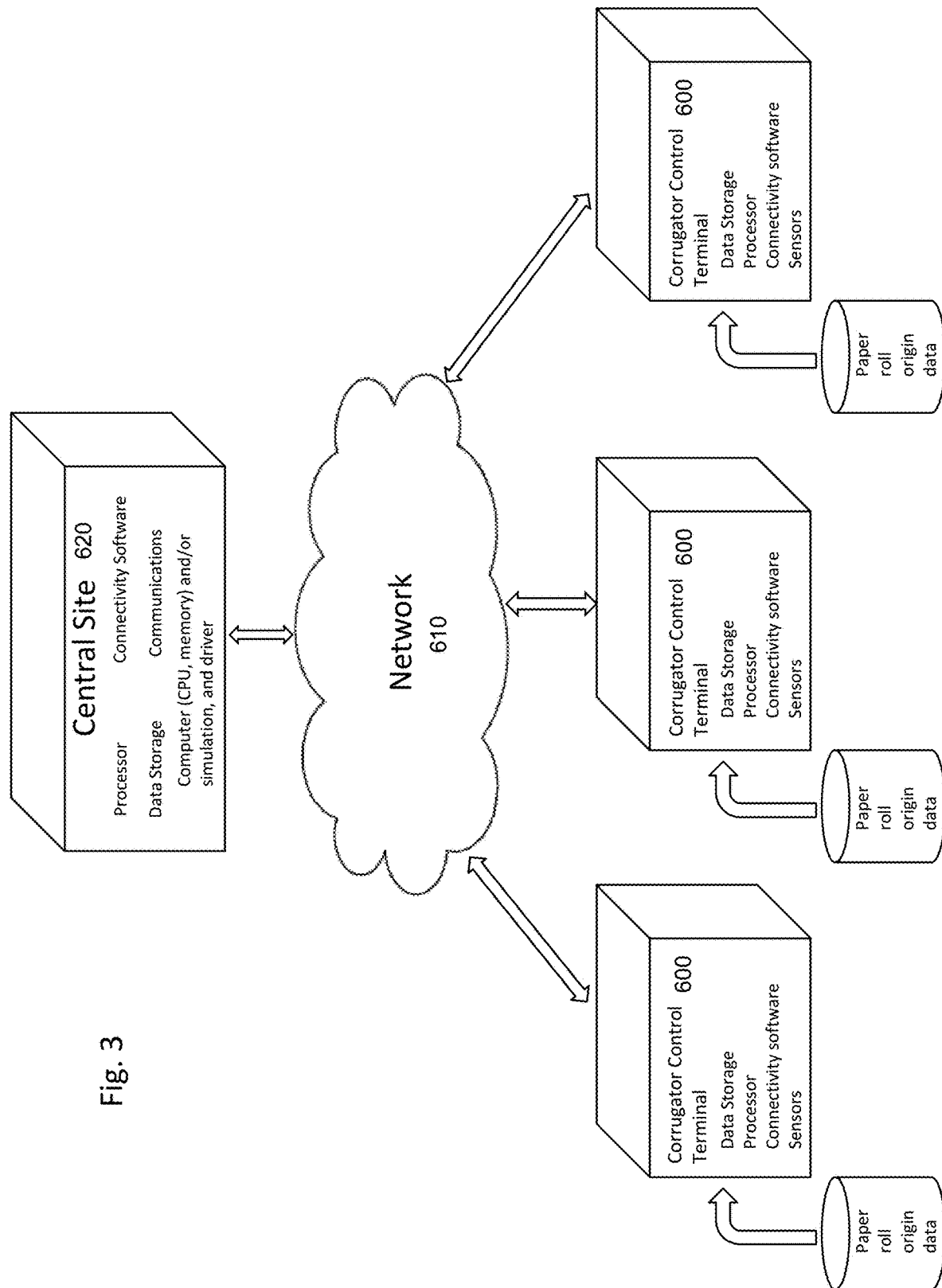
FIG. 3 is a schematic diagram of a network-based system that can be used to obtain and record hygroexpansivity attribute values for paper liners, and to assign predictive values for such attributes to papers based on data values.

FIG. 3 illustrates an exemplary network-based system to obtain, record and classify hygroexpansivity attribute values for different paper liners. The system can assign predictive values for such attributes to papers being used in disparate corrugation processes based on cross-classified data values known for the papers being used. The hygroexpansivity attribute values can be measured or calculated hygroexpansivity values for individual papers as discussed above. For example, commercially available apparatus, such as those in the Dimensional Stability System (DSS) from Emtec (Leipzig, Germany), may be used to measure the hygroexpansivity attribute values by cycling a web through one or more modules in order to wet and dry the web under tension. The DSS may include a first module (e.g. Wet Stretch Dynamics Analyzer (WSD 02) from Emtec) that is first used to wet a web of paper with a water-based liquid under adjustable tension and determine the dynamics of the wetted web's expansion. The first module is able to measure the paper moistness, humidity, and ambient temperature, and is able to measure the wet expansion range of the web up to a maximum of 25% over an unlimited duration. The wetted web may then be dried with a second module (e.g. Heat Shrinkage Analyzer (HAS) from Emtec), which can measure the dimensional stability of the web under a thermal load up to 230° C. The second module can measure stretching and shrinkage of the web by up to 27% and 5%, respectively. A third module (Penetration Dynamic Analyzer (PDA) from Emtec) may be used to measure the rate and depth at which water is absorbed by the web. By cycling a web through the modules (i.e. wetting and drying cycles), the system is able to mimic the changes in both hydroexpansivity and hygroexpansivity that occur on a corrugator. The values measured with the first and second modules then can form baseline or initial hygroexpansivity attribute values for a given paper material under the measured conditions. Further, since the modules operate at high frequency (e.g. in the millisecond range), the measured values of each module may be correlated and modeled to determine the effect of changing different variables in the system. For example, the system allows a user to see how adjusting the degree of water penetration in the web impacts the wet stretch of the web prior to and during drying. Based on the hygroexpansivity attribute values measured, predictions can be made on the starting moisture value targets for the top and bottom liners as they exit the corrugator. In order to refine these target values, and empirically derive the hygroexpansivity of the papers, the hygroexpansivity attribute values are compared to the exiting moistures of the top and bottom liner papers (as measured by moisture gauges) that result in flat paper coming out of the corrugator. This flatness can be as observed and recorded by the operator or it can be quantified by an online shape measurement device, such as a laser.

Alternatively or in addition, and as will be further evident below, hygroexpansivity attribute values can be empirically determined and assigned for a particular paper used in a particular situation based on other known or reported attributes of that paper, as well as of the machinery on which it will be used, its location and the prevalent conditions, all of which can be cross-referenced to prior-observed and recorded hygroexpansivity behaviors in prior iterations executed on the same or different corrugating equipment under some or all of the same conditions. For example, by comparing the moisture differential between the top and bottom liner (or any other paper combination), it is possible to back calculate the hygroexpansivity of each paper type made by each paper machine. By collecting such moisture differential values, it is possible to determine when paper suppliers modify their furnish for different grades of paper, and then adjust moisture parameters based on those values.

All of these data are aggregated and can be subjected to statistical correlations and analysis, such as an empirical correlation to determine an empirical hygroexpansivity attribute value in a given instance based on inputs specific to that instance. The inputs can be supplied as part of the Corrugator Input Data, discussed below, for the particular instance. Alternatively or in addition, hygroexpansivity attribute values can be tabulated and cross-referenced compared to such inputs based on the known and previously recorded behaviors for papers under similar conditions and having similar attributes previously aggregated and stored in a database. The hygroexpansivity attribute value will be representative of the true hygroexpansivity for the particular paper used the particular situation. It can be an arbitrary quantity devised via an empirical correlation or tabular cross-referencing as noted above, or a combination thereof, so long as it is representative of true hygroexpansivity and consistently determined with other hygroexpansivity attribute values of other papers in other situations (under their respective conditions) using the system. Once a hygroexpansivity attribute value is determined for a particular paper, it can be used to determine an appropriate moisture-application setpoint for that particular paper under its prevalent conditions (including the known starting and desired endpoints for moisture content), which will be supplied by the user as part of the Corrugator Input Data, discussed below.

Returning to FIG. 3, a Central Site 620 includes a Data Storage (such as a server) that is linked via a network 610 to individual Corrugator Control Terminals 600 that are operatively connected to respective corrugators, which can be at the same or at different geographic sites; and which may be operated by different operators or companies. The network 610 can be a wired or wireless network. It is contemplated that the network 610 will operate over the Internet via secure communications links between the Central Site 620 and each Corrugator Control Terminal 600.

In order to determine recommended moisture setpoints for each liner (and medium, if desired) at a given corrugator site, information regarding each paper layer and the atmospheric conditions from the corrugator site are assessed. For example, characteristic origin data about each roll of paper to be used typically is provided from the paper supplier, often in the form of a "roll tag." The origin data includes the paper grade, moisture content on leaving the point of manufacture, caliper, production date, reel position in the paper machine, reel width, reel weight, and paper web length, among other features. The origin data provides characteristics about the paper from when the roll shipped from the paper supplier, which are not necessarily the same as the roll's characteristics on arrival at the corrugating site. For example, the specific moisture content of the paper roll when it was shipped from the paper supplier may have changed en route to the corrugator based on the atmospheric conditions during shipping and storage. A number of conditions, such as those discussed above regarding hydro- and hygroexpansion, can impact the moisture content of the paper during shipment and storage. For example, when humidity is elevated, the paper fibers are more likely to gain moisture based on equilibrium thermodynamics. Conversely, when humidity is low, the paper fibers are more likely to lose moisture via the same mechanism. Such data concerning the transit conditions of the paper roll, or concerning other factors that may impact or have affected the hygroexpansivity of the paper after the origin date, also may be collected and assessed.

Additionally, the corrugator may know or collect data regarding warp and washboarding characteristics for corrugated products that have come off of the specific corrugator to be used.

All of the foregoing data (collectively the "Corrugator Input Data") are collected and input to the respective Corrugator Control Terminal 600 for making a given corrugated composite. The Corrugator Control Terminal 600 then aggregates and transmits the Corrugator Input Data via the network 610 to the Central Site 620, where a processor evaluates that data and compares it to datapoints that have been aggregated in the Central Site's 620 Data Storage, which have been cross-referenced to hygroexpansivity attribute values for paper layers. The Central Site 620 can conduct a statistical analysis, described more fully below, to identify a particular stored hygroexpansivity attribute value that is likely to be most representative of the papers (hereafter a "Predictive Hygroexpansivity Attribute Value") whose data have been stored based on comparing with all the cross-classified datapoints that are received in the Corrugator Input Data for a given paper to be used. Based on the Predictive Hygroexpansivity Attribute Value, and knowing other data points from the Corrugator Input Data (such as data for an opposing liner, downstream, post-corrugation conditions, etc.), the Central Site 620 determines "Moisture Conditioning Setpoints" for each such liner concerning the amount of moisture and the amount of thermal energy to impart to the liner pre-adhesion, most likely to achieve desired (and ideally opposing-liner matched) post-corrugation hygroexpansive behavior based on the Corrugator Input Data.

The Central Site 620 then transmits these Moisture Conditioning Setpoints to the respective Corrugator Control Terminal 600, which then uses them to operate the moisture-conditioning apparatus for the respective corrugator. Such moisture-conditioning apparatus is known, e.g. from the '802 patent, and can include a thin-film metering system as well as drum heaters as discussed above, and again more fully below.

As the disclosed network-based system is used and collects more data for different papers, and for the same papers used at different locations and under different conditions, both its accuracy and precision in selecting appropriate Moisture Conditioning Setpoints based on a given set of Corrugator Input Data will increase. But for a given corrugator site it also is contemplated that some measure of localized fine-tuning also may be desired, e.g. to compensate for conditions that may impact post-warp or corrugator-emergent warpage and which cannot be readily quantified and fed to the Central Site 620 in the Corrugator Input Data. Accordingly, a robust system that utilizes the disclosed network-based system for selecting Moisture Control Setpoints also may utilize some measure of localized feedback control to fine-tune those setpoints during operation of the corrugator.

Various methods of warp detection, including via laser, have been used by corrugators in feedback-control loops in attempts to reduce warp. Such methods include measuring the level of warp on the corrugated product immediately after it is produced. Unfortunately, by themselves these methods have proven unreliable at best, and mostly ineffective because much of the warp in corrugated products occurs some period of time post-corrugation. So immediate post-corrugation laser-shape measurement has been an unreliable way to control post-warp. However, using the substantial excess-moisture application described above, and especially when coupled with the network-based control system disclosed here, a much higher degree of predictable, reliable dimensional stability than before will be available for corrugated composites coming off of the corrugator. Accordingly, measurements taken immediately post-corrugation will be more likely to approximate the long-term shape and configuration of the corrugated product.

Using the disclosed system, post-warp measured at 24 hours, and preferably at 48 hours, compared the conformation (i.e. flatness or degree of curvature) of a corrugated composite board as or just after it emerges from the corrugator, may be reduced or adjusted to be not more than 5% relative deflection (i.e. change in the radius of curvature defining the degree of warpage), preferably not more than 3% or 2% of such relative deflection, and most preferably not more than 1% of such relative deflection. In essence, the degree of curvature (if any) of the board on exiting the corrugator will remain substantially flatter (or if tuned-in, then substantially constant) during these periods of time, and for extended periods. Accordingly, with the degree of observable post-warp having been materially reduced, one can now use laser-based (or other) post-corrugation shape-detection systems to fine-tune the Moisture-Conditioning Parameters coming from the Central Site 620, in order that the shape of the board coming off of the corrugator can be fine-tuned to precise or locally required conformations.

For example, some downstream converting equipment may operate more efficiently if there is a well-defined degree of warpage (convexity/curvature) to the corrugated boards as-supplied to the converting equipment. Using the present system, it is contemplated that a laser-shape measurement system can be used to tune in precise amounts of relative moisture to be applied to the opposing liners of a given corrugated composite before they are adhered, in order to achieve just the right degree of mis-match so that the final post-corrugated product possesses a tuned degree of convexity; i.e. a predefined radius of curvature of the post-corrugated board. And because the network-based system reliably ensures post-corrugation dimensional stability, the degree of convexity/curvature measured immediately post-corrugation will be sustained for an extended period post-corrugation—so that the shape coming off the corrugator will be that introduced later to the converting equipment.

In addition to utilizing local feedback-control systems to fine-tune the Moisture-Conditioning Parameters sent from the Central Site 620, the feedback-control data also can be sent to the Central Site 620 as an additional data parameter that can be cross-classified against the Hygroexpansivity Attribute Values and their correlated Moisture-Control Parameters stored in the Central Site's Data Storage. Such feedback-control data then becomes another cross-classified datapoint the next time the same corrugator site supplies the same Corrugator Input Data to make the same composite from the same starting materials, so that the resulting Moisture-Conditioning Parameters can be more finely tuned directly from the Central Site 620, thus minimizing the need for localized feedback-control intervention. They also can be used to statistically model and calculate different Moisture Control Parameters for different corrugator sites who have supplied comparable data as part of their own initial Corrugator Input Data. This will improve the statistical calculation of initial Moisture-Control Parameters for operating a different corrugator controlled by a different Corrugator Control Terminal 600.

As described above, it is possible to adjust the hygroexpansivity of individual paper liners to the lowest common hygroexpansivity between them before they are laminated to opposing sides of a web of medium material. This can be an iterative process; i.e. to determine what precisely is the maximum degree of reduction in hygroexpansivity attainable for each of the opposing layers, in order to tune each for it. Using the disclosed network-based system, which aggregates hygroexpansivity attribute data, this can be achieved. Indeed, the degree of anticipated or maximum hygroexpansivity reduction based on particular Moisture-Conditioning Parameters and other prevailing conditions can be modeled for each liner web and recorded by the Central Site 620. Then the Central Site can fine-tune subsequent Moisture-Conditioning Parameters for the opposing liner webs to tune them to their least common value for hygroexpansivity reduction, based on the prevailing conditions. Once the final hygroexpansivities of the individual paper liners in a given composite are adjusted to match, they would gain or lose moisture at the same rate and degree in the final corrugated product. This results in corrugated products that maintain their dimensional stability throughout and after the corrugation process.

As part of the Corrugator Input Data, sensors at the corrugator's site can measure atmospheric data that is unique to the specific location, including temperature, relative humidity, and pressure. Forecasted atmospheric conditions may also be input to the Corrugator Control Terminal 600 based on how long the final corrugated product will be stored at the corrugator's location, or based on other, known downstream conditions. For example, if the final corrugated product will be stored at the corrugator's location for 4 days, the forecasted atmospheric conditions for the four days following production of the final corrugated product may be added to the data compiled in Corrugator Control Terminal 600, and assembled into the Corrugator Input Data to be transmitted to the Central Site 620. As part of that data, the corrugator also supplies the desired characteristics of the final corrugated product, such as the desired physical dimensions and the target moisture content of the liners and medium after corrugation, which can be input by the corrugation operator.

Once transmitted to the Central Site 620, a local processor at that site can analyze the data and either look up corresponding Predictive Hygroexpansivity Attribute Values (and their associated Moisture-Conditioning Parameters), or if none are present it can calculate (such as through statistical modeling) such values based on the Corrugator Input Data. In the latter event, such calculated values would be stored as a new set of cross-classified Predictive Hygroexpansivity Values and correlated Moisture-Conditioning Parameters, available the next time similar data are queried based on similar paper characteristics from previous runs and the prevailing atmospheric conditions.

Such a statistical analysis can be based on multivariate statistical process control, which allows for the extraction of data based on multivariable data sets. Multivariate statistical process control methods are used to identify desired variables in a process and pinpoint underlying patterns within the data. The Central Site 620 will thus include a data-based model based on prior processes for generating corrugated products and which have supplied feedback concerning the efficacy of post-warp control using specific Moisture-Conditioning Parameters. The data provided by the Corrugator Control Terminal 600 is analyzed in light of the data-based model of the Central Site 620. The Central Site 620 will then determine whether any new data points are abnormal compared to existing data. If an abnormality is found, the Central Site 620 will identify any potential variables that could have caused the abnormality and determine the root cause. Following such an analysis of specific Corrugator Input Data provided by a Corrugator Control Terminal 600, a processor at or of the Central Site 620 can determine whether to discount the particular Corrugator Input Data in future determinations of future Predictive Hygroexpansivity Attribute Values based on the fact that particular data may constitute an outlier contrary to the predominant thrust of the overall data set.

When Moisture-Control Setpoints are supplied from the Central Site 620 to a Corrugator Control Terminal 600, the local operator can review those setpoints and either accept them or and make real-time adjustments if deemed necessary. If such adjustments are made, they, too, can be supplied to the Central Site 620 as additional datapoints of the Corrugator Input Data for cross-classification against determined or calculated Hygroexpansivity Attribute Values and their correlated Moisture-Control Setpoints. Alternatively, and as part of an automated process, the supplied Moisture-Control Setpoints can be automatically implemented by the Corrugator Control Terminal 600 to moisture condition each liner (and optionally medium) prior to the corrugation process.

As shown in FIG. 3, multiple Corrugator Control Terminals 600 may be connected to the network 610, and thus to the Central Site 620, in parallel. As each Corrugator Control Terminal 600 uploads data to the Central Site 620, the accumulated data is compiled into the data-based model stored in the Central Site's Data Storage. With each usage, the data underlying that model grows and the recommended Moisture-Control Setpoints provided by the Central Site 620 become more refined. For example, the Central Site 620 can compare data from prior corrugation processes, including origin data for each paper roll, the desired physical dimensions and target moisture content of the liners and medium after corrugation, and atmospheric conditions during corrugation and storage. With continued expansion of the Central Site 620 database, as optimized moisture settings for a specific paper are adjusted over time based on atmospheric conditions and desired physical properties of the final corrugated product, the Central Site 620 refines the analysis so that the recommended Moisture-Conditioning Parameters for each liner and medium to provide the highest potential of dimensional stability.

The Central Site 620 also serves as a check on the localized inputs at each Corrugator Control Terminal 600. For example, when an operator inputs process parameters into his local Corrugator Control Terminal 600, the Central Site 620 can compare the input parameters with ones it would have suggested based on its dataset and model to determine if the input parameters would be predicted to yield non-ideal results, or results outside of a threshold of allowable variance from predicted idealized results. If such an abnormality exists based on the parameters input by the corrugator operator, the Central Site 620 can alert the operator. This permits the operator to adjust the corrugating process parameters based on a data-driven, predictive model even if reasons exist that he will not want to simply accept the Moisture-Conditioning Parameters suggested by the Central Site 620. In some embodiments, a supervisor can lock out the entry of operating parameters by an operator that would result in a deviation from the supplied Moisture-Conditioning Parameters by a predefined threshold, or which would be predicted to yield additional post-warp exceeding a predefined threshold.

The recommended Moisture-Conditioning Parameters from the Central Site 620 provide benefits compared to conventional methods of adjusting the moisture content for liners and mediums. First, the Central Site 620 recommends such setpoints for each individual liner and medium based on data available not only from the paper supplier, but from the specific corrugator site and other (even competitive) corrugator sites, who do not necessarily know or have access to one another's data. This results in paper-specific moisture control that provides reproducible post-corrugation dimensional stability for virtually any corrugated composite, based on a big-data set aggregated from a variety of sources at different stages in the manufacturing process (from paper-roll manufacture, through transport, to corrugation, and even converting and storage), previously unavailable to any individual corrugator. Over time, it is contemplated that the Moisture-Conditioning Parameters calculated or modeled based on individual Corrugator Input Data will become so refined that localized feedback control may become redundant even for fine-tuning purposes. Not only does this greatly reduce the time and cost for individual corrugators to research and develop mechanisms to account and tune for the hygroexpansive behavior of corrugating liners, but it is able to supply to them setpoints based on data to which they otherwise never could have had access, including from competitors. Because the Central Site 620 never supplies information to an individual Corrugator Control Terminal 600 concerning the source of any particular data or the associated Moisture-Control Parameters delivered in a given instance, no Corrugator Control Terminal 600 ever is aware of who else is doing what, or where particular data came from. In this manner, competitive corrugators are able to improve their own operations, mutually benefiting from one another's data but without having access to or knowing about one another's operations.

It is recognized that in certain instances, a particular corrugator may decline to allow its data to be aggregated and used to provide such predictive modeling to supply Moisture-Control Parameters to its competitors. In such an instance, the big-data based modeling available to other Corrugator Control Terminals 600 can be isolated from that specific corrugator, so that both his data is not available to supply setpoints for others, and reciprocally that the big data is not utilized to supply setpoints for the specific corrugator. In such case, the Central Site 620 still can receive and aggregate Corrugator Input Data from the non-participating corrugator, but such data will be isolated and maintained in a separate data file specific to that corrugator, and any predictive or statistical modeling of Hygroexpansivity Attribute Values and corresponding Moisture-Control Parameters will be limited exclusively to data supplied by that corrugator—or to other publicly available information.

Once the Central Site 620 has supplied Moisture-Conditioning Parameters for a given set of Corrugator Input Data, the corrugator can implement those parameters and begin (or continue) to operate. Generally speaking, all such parameters will be utilized to increase the moisture content of a paper liner to greater than 10 wt. %, followed by heating, prior to adhering that liner to an adjacent layer to produce a corrugated composite. Such Moisture-Conditioning Parameters include, but are not necessarily limited to: the coating weight of excess moisture (greater than 10%) to be applied to each paper (liner) layer by the thin-film metering apparatus described below, and the amount of thermal energy to be imparted thereto prior to adhesion to adjacent layers (e.g. via heating drums, hot plates, etc.).

The method and system described herein may employ computing systems for processing information and controlling aspects of a Corrugator Control Terminal and a corrugating apparatus 1000. For example, for the corrugator Controls Terminals, the network, and the Central Site shown in FIG. 3, each terminal receives data from a paper roll and an operator relating to a process for preparing a final corrugated product. Generally, the computing systems include one or more processors.

The processor(s) of a computing system may be implemented as a combination of hardware and software elements. The hardware elements may include combinations of operatively coupled hardware components, including microprocessors, communication/networking interfaces, memory, signal filters, circuitry, etc. The processors may be configured to perform operations specified by the software elements, e.g., computer-executable code stored on computer readable medium. The processors may be implemented in any device, system, or subsystem to provide functionality and operation according to the present disclosure. The processors may be implemented in any number of physical devices/machines. For example, computer system of the central site may include one or more shared or dedicated general purpose computer systems/servers to communicate with the network and each corrugator control terminal. Optionally, parts of the processing of the example embodiments can be distributed over any combination of processors for better performance, reliability, cost, etc.

The physical devices/machines can be implemented by the preparation of integrated circuits or by interconnecting an appropriate network of conventional component circuits, as is appreciated by those skilled in the electrical art(s). The physical devices/machines, for example, may include field programmable gate arrays (FPGAs), application-specific integrated circuits (ASICs), digital signal processors (DSPs), etc. The physical devices/machines may reside on a wired or wireless network, e.g., LAN, WAN, Internet, cloud, near-field communications, etc., to communicate with each other and/or other systems, e.g., Internet/web resources.

Appropriate software can be readily prepared by programmers of ordinary skill based on the teachings of the example embodiments, as is appreciated by those skilled in the software arts. Thus, the example embodiments are not limited to any specific combination of hardware circuitry and/or software. Stored on one computer readable medium or a combination of computer readable media, the computing systems may include software for controlling the devices and subsystems of the example embodiments, for driving the devices and subsystems of the example embodiments, for enabling the devices and subsystems of the example embodiments to interact with a human user (user interfaces, displays, controls), etc. Such software can include, but is not limited to, device drivers, operating systems, development tools, applications software, etc. A computer readable medium further can include the computer program product(s) for performing all or a portion of the processing performed by the example embodiments. Computer program products employed by the example embodiments can include any suitable interpretable or executable code mechanism, including but not limited to complete executable programs, interpretable programs, scripts, dynamic link libraries (DLLs), applets, etc. The processors may include, or be otherwise combined with, computer-readable media. Example forms of computer-readable media include a hard disk, any other suitable magnetic medium, CD-ROM, CDRW, DVD, any other suitable optical medium, RAM, PROM, EPROM, FLASH-EPROM, any other suitable memory chip or cartridge, a carrier wave, or any other suitable medium from which a computer can read.

The Central Site and Corrugator Control Terminals may also include databases for storing data. For example, the central site may include different databases for storing individual data parameters from the Corrugator Input Data or for different categories of such data, such as atmospheric conditions, temperature and relative humidity, etc. One or more additional database(s) may be used for storing physical-characteristic information on each type of paper. Still further databases may be used to store cross-classified or correlated (or calculated) Hygroexpansivity Attribute Values. The data entries in all such databases may be cross-classified or cross-referenced using appropriate markers. Such databases may be stored on the computer readable media described above and may organize the data according to any appropriate approach. For examples, the data may be stored in relational databases, navigational databases, flat files, lookup tables, etc. Furthermore, the databases may be managed according to any type of database management software.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents.

What is claimed is:

1. A method of producing a corrugated product, comprising:
    with respect to a first face-sheet web:
    a. adjusting a moisture content in the first face-sheet web to a first range of greater than 10 wt. % and up to 20 wt. % by applying a first thin film of liquid to a first surface thereof;
    b. thereafter heating the first face-sheet web; and
    c. thereafter bonding the first surface of the first face-sheet web to a first side of a fluted medium.

2. The method of claim 1, wherein:
    the step of adjusting the moisture content in the first face-sheet web yields excess moisture in the first face-sheet web; and
    the step of heating the first face-sheet web with said excess moisture therein reduces internal stress therein and comprises drying said first face-sheet web under restraint, thereby increasing a machine-direction tensile strength thereof by at least 2.5%.

3. The method of claim 1, further comprising, with respect to a second face-sheet web:
    d. adjusting a moisture content in the second face-sheet web to a second range of greater than 10 wt. % and up to 30 wt. % by applying a second thin film of liquid to a first surface thereof;
    e. thereafter heating the second face-sheet web; and
    f. thereafter bonding the first surface of the second face-sheet web to a second side of said fluted medium.

4. The method of claim 3, said second range being greater than 10 wt. % and up to 20 wt. %, wherein:
    the step of adjusting the moisture content in the second face-sheet web yields excess moisture in the second face-sheet web; and
    the step of heating the second face-sheet web with said excess moisture therein reduces internal stress therein and comprises drying said second face-sheet web under restraint, thereby increasing a machine-direction tensile strength thereof by at least 2.5%.

5. The method of claim 3, the second thin film being applied to the first surface of the second face-sheet web by drawing said second face-sheet web under tension against a surface of a second moisture-application roller having a metered water-film thickness thereon of 10-50 microns.

6. The method of claim 5, said second moisture-application roller operating at a roll-speed ratio at least 5% deviant from 100% relative to said second face-sheet web, either overspeed or underspeed but in the same lineal direction as said second face-sheet web.

7. The method of claim 6, said second face-sheet web being drawn against said second moisture-application roller over a dwell distance of 15-100 mm.

8. The method of claim 5, wherein the tension of said second face-sheet web against said surface of said second moisture-application roller is from 8 kg/meter to 180 kg/meter.

9. The method of claim 1, wherein the corrugated product exhibits no more than 5% relative deflection in the radius of curvature thereof at 24 hours after being made from said first face-sheet web and said fluted medium.

10. The method of claim 1, said first range being 11 wt. % to 15 wt. %.

11. The method of claim 1, the first thin film being applied to the first surface of the first face-sheet web by drawing said first face-sheet web under tension against a surface of a first moisture-application roller having a metered water-film thickness thereon of 10-50 microns.

12. The method of claim 11, said first moisture-application roller operating at a roll-speed ratio at least 5% deviant from 100% relative to said first face-sheet web, either overspeed or underspeed but in the same lineal direction as said first face-sheet web.

13. The method of claim 12, said first face-sheet web being drawn against said first moisture-application roller over a dwell distance of 15-100 mm.

14. The method of claim 11, wherein the tension of said first face-sheet web against said surface of said first moisture-application roller is from 8 kg/meter to 180 kg/meter.

15. The method of claim 1, further comprising:
supplying to a central site corrugator input data comprising data related to: a) either or both of the first face-sheet web or the fluted medium, b) characteristics of equipment used to make said corrugated product, c) prevailing atmospheric conditions, or d) anticipated downstream conditions of the corrugated product when finished; and
receiving from the central site a first moisture-conditioning setpoint for said first face-sheet web, the setpoint being based on the corrugator input data supplied to the central site, said moisture adjustment in said first face-sheet web being made according to the respective first moisture-conditioning setpoint.

* * * * *